US012745180B2

(12) United States Patent
Wang et al.

(10) Patent No.: US 12,745,180 B2
(45) Date of Patent: Sep. 22, 2026

(54) METHOD AND APPARATUS FOR SIGNAL COMMUNICATIONS, AND READABLE STORAGE MEDIUM

(71) Applicant: DATANG MOBILE COMMUNICATIONS EQUIPMENT CO., LTD., Beijing (CN)

(72) Inventors: Jiaqing Wang, Beijing (CN); Yuwan Su, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 327 days.

(21) Appl. No.: 18/551,133

(22) PCT Filed: Mar. 25, 2022

(86) PCT No.: PCT/CN2022/083022

§ 371 (c)(1),
(2) Date: Sep. 18, 2023

(87) PCT Pub. No.: WO2022/206594

PCT Pub. Date: Oct. 6, 2022

(65) Prior Publication Data

US 2024/0172123 A1 May 23, 2024

(30) Foreign Application Priority Data

Apr. 1, 2021 (CN) ......................... 202110358409.0

(51) Int. Cl.
*H04W 52/02* (2009.01)
*H04W 68/02* (2009.01)

(52) U.S. Cl.
CPC ... *H04W 52/0235* (2013.01); *H04W 52/0219* (2013.01); *H04W 68/02* (2013.01)

(58) Field of Classification Search
CPC ......... H04W 52/0235; H04W 52/0216; H04W 52/0219; H04W 52/028; H04W 68/025;
(Continued)

(56) References Cited

U.S. PATENT DOCUMENTS

2013/0310086 A1 11/2013 Hu et al.
2020/0053645 A1 2/2020 Charbit et al.
(Continued)

FOREIGN PATENT DOCUMENTS

CN 109286966 A 1/2019
CN 110198557 A 9/2019
(Continued)

OTHER PUBLICATIONS

International Search Report for International Application No. PCT/CN2022/083022 issued by the International Patent Office on Jun. 20, 2022, and its English translation provided by WIPO.
(Continued)

*Primary Examiner* — Jianye Wu
(74) *Attorney, Agent, or Firm* — Ladas & Parry, LLP

(57) ABSTRACT

Provided are a method and an apparatus for signal communications and a readable storage medium. The method includes: transmitting, by a network device, energy-saving signals to a terminal on a transmission resource, wherein the energy-saving signals are used to indicate whether there is paging information in a group of paging occasions. The energy-saving signals corresponding to the transmission resource are divided into at least one group of energy-saving signals, and each paging occasion at least corresponds to one group of energy-saving signals. One group of energy-saving signals corresponding to each paging occasion includes at least one energy-saving signal subgroup, and one user group in each paging occasion at least corresponds to one energy-saving signal subgroup.

17 Claims, 3 Drawing Sheets

(58) Field of Classification Search
CPC ... H04W 68/005; H04W 68/02; H04W 76/28; Y02D 30/70
See application file for complete search history.

(56) References Cited

U.S. PATENT DOCUMENTS

| | | | | |
|---|---|---|---|---|
| 2021/0168759 | A1 | 6/2021 | Pan et al. | |
| 2021/0176729 | A1* | 6/2021 | Liu | H04W 68/005 |
| 2022/0046585 | A1 | 2/2022 | Wu et al. | |
| 2022/0159570 | A1 | 5/2022 | Liu et al. | |
| 2022/0295404 | A1* | 9/2022 | Wang | H04W 52/0235 |
| 2023/0015708 | A1* | 1/2023 | Gurumoorthy | H04W 52/0229 |

FOREIGN PATENT DOCUMENTS

| | | | | |
|---|---|---|---|---|
| CN | 110958672 | A | 4/2020 | |
| CN | 110972237 | A | 4/2020 | |
| CN | 111132280 | A | 5/2020 | |
| CN | 111510998 | A | 8/2020 | |
| CN | 112040559 | A * | 12/2020 | H04W 4/0833 |
| CN | 114071710 | A | 2/2022 | |
| WO | 2018137284 | A1 | 8/2018 | |
| WO | 2018174635 | A1 | 9/2018 | |

OTHER PUBLICATIONS

Written Opinion for International Application No. PCT/CN2022/083022 issued by the International Patent Office on Nov. 8, 2022, and its English translation provided by WIPO.

International Preliminary Report on Patentability for International Application No. PCT/CN2022/083022 issued by the International Patent Office on Oct. 3, 2023 and its English translation provided by WIPO.

"Configurations of wake-up signal for feNB-IoT," 3GPP TSG RAN WG1 Meeting #90bis, R1-1717344, Prague, Czech Republic, Oct. 9-13, 2017, Source: Intel Corporation, Agenda Item: 6.2.6.1.1.2.

"Paging enhancement for UE power saving," 3GPP TSG RAN WG1 #104-e, R1-2100392, e-Meeting, Jan. 25-Feb. 5, 2021, Source: CATT, Agenda Item: 8.7.1.1.

"Paging enhancement for UE power saving," 3GPP TSG RAN WG1 #106bis-e, R1-2109235, e-Meeting, Oct. 11-19, 2021, Source:CATT, Agenda Item:8.7.1.1.

"Summary#3 of Paging Enhancements," 3GPP TSG RAN WG1 #106bis-e, R1-2110539, e-Meeting, Oct. 11-19, 2021, Source: Moderator (MediaTek), Agenda Item: 8.7.1.1.

"Details on paging sub-grouping indication and determination," 3GPP TSG-RAN WG2 Meeting #113 Electronic R2-2101148, Elbonia, Jan. 25-Feb. 5, 2021, Source: Nokia, Nokia Shanghai Bell, Agenda item: 8.9.2.

Office Action and search report issued on Oct. 31, 2024 for the corresponding Chinese Patent Application No. 202110358409.0.

Ericsson; "Service based WUS groups, common WUS and paging multiplexing"; 3GPP TSG-RAN WG2 #107; Tdoc R2-1910434 (Revision of R2-1907912); Prague, Czech Republic, Aug. 26-30, 2019.

Vivo; "Discussion on Paging Grouping"; 3GPP TSG-RAN WG1 #103-e; R1-2007675; e-meeting; Oct. 26-Nov. 13, 2020.

Extended European Search Report issued on Oct. 9, 2024 for the corresponding European Patent Application No. 22778777.7.

* cited by examiner

METHOD AND APPARATUS FOR SIGNAL COMMUNICATIONS, AND READABLE STORAGE MEDIUM

CROSS-REFERENCE TO RELATED APPLICATIONS

This application is the U.S. national phase of PCT Application No. PCT/CN2022/083022 filed on Mar. 25, 2022, which claims a priority to Chinese Patent Application No. 202110358409.0 filed on Apr. 1, 2021, the disclosures of which are incorporated by reference herein in their entireties.

TECHNICAL FIELD

The present disclosure relates to the field of communications technology, in particular to a method and an apparatus for signal communications, and a readable storage medium.

BACKGROUND

In the new radio (New Radio, NR) system, a power saving design of user equipment (User Equipment, UE) becomes quite necessary. To this end, research has been proposed on an energy-saving solution for a radio resource control idle (Radio Resource Control-Idle, RRC_IDLE) state, which includes reducing the quantity of unnecessary paging (Paging) receptions.

In NR protocols, a paging message includes two parts, namely paging physical downlink control channel (Physical downlink control channel, PDCCH) and paging physical downlink shared channel (Physical downlink shared channel, PDSCH). Considering power conservation, the paging reception for a UE in RRC_IDLE and RRC_INACTIVE (RRC inactive) states follows the principle of discontinuous reception (Discontinuous Reception, DRX). Generally, a network side may configure a paging cycle, also referred to as DRX cycle, for the UE through higher layer signaling. The UE monitors a paging occasion (PO) in each DRX cycle. A PO is formed by a group of PDCCH monitoring occasions (monitoring occasion, MO), which may include multiple slots (such as subframes, or orthogonal frequency division multiplex (Orthogonal frequency division multiplex, OFDM) symbols), and paging downlink control information (Downlink Control Information, DCI) is transmitted on the PDCCH MO. A paging frame (Paging Frame, PF) is a radio frame, and may include one or more POs or starting points of PO(s). In the multi-beam (multi-beam) operation, UE assumes that all transmission beams repeatedly transmit the same paging message and short message. Selecting an appropriate beam and receiving the paging message and the short message is based on UE implementation.

The Paging PDCCH in the RRC-Idle/Inactive (inactive) state defined in related technologies is scrambled through paging radio network temporary Identity (Paging Radio Network Temporary Identity, P-RNTI), and P-RNTI is shared by all UEs. At a corresponding PO time instant, multiple UEs may need to monitor the paging. As long as one UE has a paging message, the network side will send, at the PO time instant, DCI scrambled by P-RNTI for transmitting the paging of the UE. Other UEs need to wake up at the PO time instant to monitor the DCI scrambled by P-RNTI, regardless of whether they have their own Paging or not. Once the DCI scrambled by P-RNTI is monitored, subsequent related operations are performed, which include PDCCH and PDSCH demodulation and decoding, until the UE finds that it is not in UE list information for recording a transmission of the Paging message. This approach results in unnecessary power consumption for the UE.

In order to reduce the probability of false alarms during paging, in relevant art, it has been proposed that the network side sends a paging early indication (Paging Early indication, PEI) before PO in advance. If the PEI indicates that the terminal has a Paging message in the subsequent PO, the terminal will monitor paging PDCCH on multiple MOs in the subsequent PO to receive the paging message; otherwise, the terminal will shut down a receiver and enter sleep, and does not attempt to receive the paging message in the corresponding PO.

There are two candidate solutions for PEI, one is DCI-based PEI (DCI based PEI), and the other is sequence-based PEI (sequence based PEI). The detection performance of the sequence based PEI is better than that of the DCI based PEI. However, the two candidate solutions in the related technologies cannot provide a good solution regarding how to give indication when the sequence based PEI supports multiple POs and each of the POs supports multiple user groups, which results in a high overhead for the network device, and a complex detection for the terminal.

SUMMARY

Embodiments of the present disclosure provide a method and an apparatus for signal communications, and a readable storage medium, to reduce the overhead of network device and reduce the complexity of terminal detection.

In a first aspect, an embodiment of the present disclosure provides a method for signal communications, which includes: transmitting, by a network device, energy-saving signals to a terminal on a transmission resource, where the energy-saving signals are used to indicate whether there is paging information in a group of paging occasions,

- where the energy-saving signals corresponding to the transmission resource are divided into at least one group of energy-saving signals, and each paging occasion at least corresponds to one group of energy-saving signals, and
- the one group of energy-saving signals corresponding to each paging occasion includes at least one energy-saving signal subgroup, and one user group in each paging occasion at least corresponds to one energy-saving signal subgroup.

Optionally, the phrase each paging occasion at least corresponds to one group of energy-saving signals includes at least one of:

- each paging occasion corresponds to the one group of energy-saving signals; or
- each paging occasion corresponds to the one group of energy-saving signals and one group of common energy-saving signals.

Optionally, in case of G2=N1, each paging occasion corresponds to the one group of energy-saving signals; and

- in case of G2>N1, each paging occasion corresponds to the one group of energy-saving signals and the one group of common energy-saving signals,
- where represents the quantity of the at least one group of energy-saving signals included in the energy-saving signals corresponding to the transmission resource, N1 represents the quantity of paging occasions included in the group of paging occasions corresponding to the transmission resource, and G2 and N1 are both integers greater than 0.

Optionally, in a case that there is only one paging occasion in the group of paging occasions, the one paging occasion corresponds to one group of energy-saving signals.

Optionally, the phrase the one user group in each paging occasion at least corresponds to one energy-saving signal subgroup includes at least one of:

the one user group in each paging occasion corresponds to the one energy-saving signal subgroup; or the one user group in each paging occasion corresponds to the one occasion.

Optionally, in case of G3=G1, the one user group in each paging occasion corresponds to the one energy-saving signal subgroup; and in case of G3>G1, the one user group in each paging occasion corresponds to the one energy-saving signal subgroup and the one common energy-saving signal in the paging occasion, where G3 represents the quantity of energy-saving signal subgroups included in the one group of energy-saving signals corresponding to each paging occasion, G1 represents the quantity of user groups included in each paging occasion, and G3 and G1 are integers greater than 0.

Optionally, the transmitting, by the network device, the energy-saving signals to the terminal on the transmission resource includes: transmitting, by the network device, the energy-saving signals to the terminal on M1 transmission resources, where a maximum of M2 energy-saving signals are transmitted on each of the transmission resources, each of M1 and M2 being an integer.

Optionally, M1≤2 and M2≤3.

Optionally, the transmitting, by the network device, the energy-saving signals to the terminal on the M1 transmission resources includes:

transmitting, by the network device, one energy-saving signal, two energy-saving signals or three energy-saving signals to the terminal on one transmission resource; or transmitting, by the network device, the energy-saving signals to the terminal on two transmission resources, where one energy-saving signal, two energy-saving signals or three energy-saving signals are transmitted on each transmission resource.

Optionally, the transmitting, by the network device, the energy-saving signals to the terminal on the M1 transmission resources includes at least one of:

in case of P≤P1, transmitting, by the network device, one energy-saving signal to the terminal on one transmission resource;

in case of P1<P≤P2, transmitting, by the network device, two energy-saving signals to the terminal on one transmission resource;

in case of P1<P≤ P2, transmitting, by the network device, one energy-saving signal to the terminal on each of two transmission resources;

in case of P>P3, transmitting, by the network device, three energy-saving signals to the terminal on one transmission resource, or transmitting, by the network device, three energy-saving signals to the terminal on two transmission resources, where P represents a paging rate, P1, P2 and P3 represent a first preset value, a second preset value and a third preset value, respectively, P1<P2<P3, and each of P, P1, P2 and P3 is greater than 0.

Optionally, the transmitting, by the network device, the energy-saving signals to the terminal on the transmission resource includes at least one of:

in a case where the network device needs to wake up M3 paging occasions in a current group of paging occasions, transmitting, by the network device, a common energy-saving signal specific to group of paging occasions to the terminal, or, transmitting, by the network device, an energy-saving signal corresponding to each paging occasion of the M3 paging occasions to the terminal;

in a case where the network device needs to wake up at least M4 users in the group of paging occasions, transmitting, by the network device, a common energy-saving signal specific to group of paging occasions to the terminal;

in a case where the network device needs to wake up at least M5 user groups in one paging occasion, transmitting, by the network device, a common energy-saving signal specific to paging occasion or a common energy-saving signal specific to group of paging occasions to the terminal;

in a case where the network device needs to wake up one user group in one paging occasion, transmitting, by the network device, an energy-saving signal specific to user group to the terminal, where M3 is an integer greater than 0, and M3 is less than or equal to the total quantity of paging occasions in the group of paging occasions; M4 is an integer greater than 0; M5 is an integer greater than 0, and M5 is less than or equal to the total quantity of user groups in one paging occasion.

Optionally, the method further includes: transmitting, by the network device to the terminal, one or two pieces of the following information: the quantity G1 of user groups included in each paging occasion, the quantity N1 of paging occasions included in a group of paging occasions corresponding to one transmission resource.

Optionally, the method further includes at least one of following steps:

transmitting, by the network device, first indication information to the terminal, where the first indication information is used to indicate a manner in which the energy-saving signals corresponding to the transmission resource are divided into at least one group of energy-saving signals;

transmitting, by the network device, second indication information to the terminal, where the second indication information is used to indicate a manner in which the one group of energy-saving signals corresponding to each paging occasion are divided into energy-saving signal subgroups.

In a second aspect, an embodiment of the present disclosure provides a method for signal communications, which includes:

receiving, by a terminal, energy-saving signals transmitted by a network device on a transmission resource, where the energy-saving signals are used to indicate whether there is paging information in a group of paging occasions; and receiving, by the terminal, a paging message according to the energy-saving signals, where the energy-saving signals corresponding to the transmission resource are divided into at least one group of energy-saving signals, and each paging occasion at least corresponds to one group of energy-saving signals, and the one group of energy-saving signals corresponding to each paging occasion includes at least one energy-saving signal subgroup, and one user group in each paging occasion at least corresponds to one energy-saving signal subgroup.

Optionally, the receiving, by the terminal, the energy-saving signals transmitted by the network device on the transmission resource includes: receiving at least one of following signals: a common energy-saving signal specific to group of paging occasions; an energy-saving signal corresponding to each paging occasion; a common energy-saving signal specific to paging occasion; or an energy-saving signal specific to user group.

Optionally, the receiving, by the terminal, the paging message according to the energy-saving signal includes:

in a case where the common energy-saving signal specific to group of paging occasions or the energy-saving signal corresponding to each paging occasion which corresponds to the terminal is detected on the transmission resource for the energy-saving signal, receiving, by the terminal, the paging message on a corresponding paging occasion;

in a case where the common energy-saving signal specific to paging occasion which corresponds to the terminal is detected on the transmission resource for the energy-saving signal, receiving, by the terminal, the paging message on a corresponding paging occasion;

in a case where the energy-saving signal specific to user group which corresponds to the terminal is detected on the transmission resource for the energy-saving signal, receiving, by the terminal, the paging message on a corresponding paging occasion.

Optionally, the method further includes: receiving, by the terminal, information transmitted by the network device, or obtaining, by the terminal, information that is predefined, where the information includes one or two pieces of following information: the quantity G1 of user groups included in each paging occasion, the quantity N1 of paging occasions included in a group of paging occasions corresponding to one transmission resource; and the method further includes: determining, by the terminal based on the information, a manner in which the energy-saving signals corresponding to the transmission resource are divided into at least one group of energy-saving signals.

Optionally, the method further includes at least one of following steps:

receiving, by the terminal, first indication information transmitted by the network device, where the first indication information is used to indicate a manner in which the energy-saving signals corresponding to the transmission resource are divided into at least one group of energy-saving signals;

receiving, by the terminal, second indication information transmitted by the network device, where the second indication information is used to indicate a manner in which the one group of energy-saving signals corresponding to each paging occasion are divided into energy-saving signal subgroups.

In a third aspect, an embodiment of the present disclosure provides an apparatus for signal communications, applied to a network device, which includes a memory, a transceiver and a processor, where the memory is configured to store a computer program; the transceiver is configured to transmit and receive data under control of the processor; and the processor is configured to read the computer program in the memory to perform following operations:

transmitting energy-saving signals to a terminal on a transmission resource, where the energy-saving signals are used to indicate whether there is paging information in a group of paging occasions, where the energy-saving signals corresponding to the transmission resource are divided into at least one group of energy-saving signals, and each paging occasion at least corresponds to one group of energy-saving signals, the one group of energy-saving signals corresponding to each paging occasion includes at least one energy-saving signal subgroup, and one user group in each paging occasion at least corresponds to one energy-saving signal subgroup.

Optionally, the phrase each paging occasion at least corresponds to one group of energy-saving signals includes at least one of the following:

each paging occasion corresponding to the one group of energy-saving signals; or each paging occasion corresponding to the one group of energy-saving signals and one group of common energy-saving signals.

Optionally, in case of $G2=N1$, each paging occasion corresponds to the one group of energy-saving signals; and in case of $G2>N1$, each paging occasion corresponds to the one group of energy-saving signals and the one group of common energy-saving signals, where G2 represents the quantity of the at least one group of energy-saving signals included in the energy-saving signals corresponding to the transmission resource, N1 represents the quantity of paging occasions included in the group of paging occasions corresponding to one transmission resource, and G2 and N1 are both integers greater than 0.

Optionally, in a case that there is only one paging occasion in the group of paging occasions, the one paging occasion corresponds to one group of energy-saving signals.

Optionally, the phrase the one user group in each paging occasion at least corresponds to one energy-saving signal subgroup includes at least one of the following:

the one user group in each paging occasion corresponds to the one energy-saving signal subgroup; or the one user group in each paging occasion corresponding to the one occasion.

Optionally, in case of $G3=G1$, the one user group in each paging occasion corresponds to the one energy-saving signal subgroup; and in case of $G3>G1$, the one user group in each paging occasion corresponds to the one energy-saving signal subgroup and the one common energy-saving signal in the paging occasion, where G3 represents the quantity of energy-saving signal subgroups included in one group of energy-saving signals corresponding to each paging occasion, G1 represents the quantity of user groups included in each paging occasion, and G3 and G1 are integers greater than 0.

Optionally, the processor is configured to read the computer program in the memory to perform the following operation: transmitting the energy-saving signals to the terminal on M1 transmission resources, where a maximum of M2 energy-saving signals are transmitted on each of the transmission resources, each of M1 and M2 being an integer.

Optionally, $M1 \leq 2$ and $M2 \leq 3$.

Optionally, the processor is configured to read the computer program in the memory to perform:

transmitting one energy-saving signal, two energy-saving signals or three energy-saving signals to the terminal on one transmission resource; or transmitting the energy-saving signals to the terminal on two transmission resources, where one energy-saving signal, two energy-saving signals or three energy-saving signals are transmitted on each transmission resource.

Optionally, the processor is configured to read the computer program in the memory to perform the following operations:

in case of P≤ P1, transmitting one energy-saving signal to the terminal on one transmission resource;

in case of P1<P≤ P2, transmitting two energy-saving signals to the terminal on one transmission resource;

in case of P1<P≤ P2, transmitting one energy-saving signal to the terminal on each of two transmission resources;

in case of P>P3, transmitting three energy-saving signals to the terminal on one transmission resource, or transmitting three energy-saving signals to the terminal on two transmission resources, where P represents a paging rate, P1, P2 and P3 respectively represent a first preset value, a second preset value and a third preset value, P1<P2<P3, and each of P, P1, P2 and P3 is greater than 0.

Optionally, the processor is configured to read the computer program in the memory to perform the following operations:

in a case where the network device needs to wake up M3 paging occasions in a current group of paging occasions, transmitting a common energy-saving signal specific to group of paging occasions to the terminal, or, transmitting an energy-saving signal corresponding to each paging occasion of the M3 paging occasions to the terminal;

in a case where the network device needs to wake up at least M4 users in the group of paging occasions, transmitting a common energy-saving signal specific to group of paging occasions to the terminal;

in a case where the network device needs to wake up at least M5 user groups in one paging occasion, transmitting a common energy-saving signal specific to paging occasion or a common energy-saving signal specific to group of paging occasions to the terminal;

in a case where the network device needs to wake up one user group in one paging occasion, transmitting an energy-saving signal specific to user group to the terminal, where M3 is an integer greater than 0, and M3 is less than or equal to the total quantity of paging occasions in the group of paging occasions; M4 is an integer greater than 0; M5 is an integer greater than 0, and M5 is less than or equal to the total quantity of user groups in one paging occasion.

Optionally, the processor is configured to read the computer program in the memory to perform the following operations:

transmitting, to the terminal, one or two pieces of the following information:

the quantity G1 of user groups included in each paging occasion, the quantity N1 of paging occasions included in a group of paging occasions corresponding to one transmission resource.

Optionally, the processor is configured to read the computer program in the memory to perform the following operations:

transmitting first indication information to the terminal, where the first indication information is used to indicate a manner in which the energy-saving signals corresponding to the transmission resource are divided into at least one group of energy-saving signals;

transmitting second indication information to the terminal, where the second indication information is used to indicate a manner in which the one group of energy-saving signals corresponding to each paging occasion are divided into energy-saving signal subgroups.

In a fourth aspect, an embodiment of the present disclosure provides an apparatus for signal communications, applied to a terminal, which includes a memory, a transceiver and a processor, where the memory is configured to store a computer program; the transceiver is configured to send and receive data under control of the processor; and the processor is configured to read the computer program in the memory to perform following operations:

receiving energy-saving signals transmitted by a network device on a transmission resource, where the energy-saving signals are used to indicate whether there is paging information in a group of paging occasions; and receiving a paging message according to the energy-saving signals, where the energy-saving signals corresponding to the transmission resource are divided into at least one group of energy-saving signals, and each paging occasion at least corresponds to one group of energy-saving signals, and the one group of energy-saving signals corresponding to each paging occasion includes at least one energy-saving signal subgroup, and one user group in each paging occasion at least corresponds to one energy-saving signal subgroup.

Optionally, the processor is configured to read the computer program in the memory to perform the following operations: receiving at least one of following signals: a common energy-saving signal specific to group of paging occasions; an energy-saving signal corresponding to each paging occasion; a common energy-saving signal specific to paging occasion; an energy-saving signal specific to user group.

Optionally, the processor is configured to read the computer program in the memory to perform the following operations:

in a case where the common energy-saving signal specific to group of paging occasions or the energy-saving signal corresponding to each paging occasion which corresponds to the terminal is detected on the transmission resource for the energy-saving signal, receiving the paging message on a corresponding paging occasion;

in a case where the common energy-saving signal specific to paging occasion which corresponds to the terminal is detected on the transmission resource for the energy-saving signal, receiving the paging message on a corresponding paging occasion;

in a case where the energy-saving signal specific to user group which corresponds to the terminal is detected on the transmission resource for the energy-saving signal, receiving the paging message on a corresponding paging occasion.

Optionally, the processor is configured to read the computer program in the memory to perform the following operations:

receiving information transmitted by the network device, or obtaining information that is predefined, where the information includes one or two pieces of following information: the quantity G1 of user groups included in each paging occasion, the quantity N1 of paging occasions included in a group of paging occasions corresponding to one transmission resource; and determining, based on the information, a manner in which the energy-saving signals corresponding to the transmission resource are divided into the at least one group of energy-saving signals.

Optionally, the processor is configured to read the computer program in the memory to perform the following operations:

receiving first indication information transmitted by the network device, where the first indication information is used to indicate a manner in which the energy-saving signals corresponding to the transmission resource are divided into the at least one group of energy-saving signals;

receiving second indication information transmitted by the network device, where the second indication information is used to indicate a manner in which the one group of energy-saving signals corresponding to each paging occasion are divided into energy-saving signal subgroups.

In a fifth aspect, an embodiment of the present disclosure provides an apparatus for signal communications, applied to a network device, which includes: a first transmission unit, configured to transmit energy-saving signals to a terminal on a transmission resource, where the energy-saving signals are used to indicate whether there is paging information in a group of paging occasions, where the energy-saving signals corresponding to the transmission resource are divided into at least one group of energy-saving signals, and each paging occasion at least corresponds to one group of energy-saving signals, and the one group of energy-saving signals corresponding to each paging occasion includes at least one energy-saving signal subgroup, and one user group in each paging occasion at least corresponds to one energy-saving signal subgroup.

Optionally, the phrase each paging occasion at least corresponds to one group of energy-saving signals includes at least one of:

each paging occasion corresponds to the one group of energy-saving signals; or each paging occasion corresponds to the one group of energy-saving signals and one group of common energy-saving signals.

Optionally, in case of G2=N1, each paging occasion corresponds to the one group of energy-saving signals; and in case of G2>N1, each paging occasion corresponds to the one group of energy-saving signals and the one group of common energy-saving signals, where G2 represents the quantity of the at least one group of energy-saving signals included in the energy-saving signals corresponding to the transmission resource, N1 represents the quantity of paging occasions included in a group of paging occasions corresponding to one transmission resource, and G2 and N1 are both integers greater than 0.

Optionally, in a case that there is only one paging occasion in the group of paging occasions, the one paging occasion corresponds to one group of energy-saving signals.

Optionally, the phrase the one user group in each paging occasion at least corresponds to one energy-saving signal subgroup includes at least one of the following:

the one user group in each paging occasion corresponding to the one energy-saving signal subgroup; or the one user group in each paging occasion corresponding to the one occasion.

Optionally, in case of G3=G1, the one user group in each paging occasion corresponds to the one energy-saving signal subgroup; and in case of G3>G1, the one user group in each paging occasion corresponds to the one energy-saving signal subgroup and the one common energy-saving signal in the paging occasion, where G3 represents the quantity of energy-saving signal subgroups included in one group of energy-saving signals corresponding to each paging occasion, G1 represents the quantity of user groups included in each paging occasion, and G3 and G1 are integers greater than 0.

Optionally, the first transmission unit is configured to transmit the energy-saving signals to the terminal on the transmission resource on M1 transmission resources, where a maximum of M2 energy-saving signals are transmitted on each of the transmission resources, each of M1 and M2 being an integer.

Optionally, M1≤2 and M2≤3.

Optionally, the first transmission unit is configured to transmit one energy-saving signal, two energy-saving signals or three energy-saving signals to the terminal on one transmission resource; or to transmit the energy-saving signals to the terminal on two transmission resources, where one energy-saving signal, two energy-saving signals or three energy-saving signals are transmitted on each transmission resource.

Optionally, the first transmission unit is configured to perform at least one of:

in case of P≤ P1, transmitting one energy-saving signal to the terminal on one transmission resource;

in case of P1<P≤ P2, transmitting two energy-saving signals to the terminal on one transmission resource;

in case of P1<P≤ P2, transmitting one energy-saving signal to the terminal on each of two transmission resources;

in case of P>P3, transmitting three energy-saving signals to the terminal on one transmission resource, or transmitting, by the network device, three energy-saving signals to the terminal on each of two transmission resources, where P represents a paging rate, P1, P2 and P3 respectively represent a first preset value, a second preset value and a third preset value, P1<P2<P3, and each of P, P1, P2 and P3 is greater than 0.

Optionally, the first transmission unit is configured to perform at least one of:

in a case where the network device needs to wake up M3 paging occasions in a current group of paging occasions, transmitting a common energy-saving signal specific to group of paging occasions to the terminal, or, transmitting, by the network device, an energy-saving signal corresponding to each paging occasion of the M3 paging occasions to the terminal;

in a case where the network device needs to wake up at least M4 users in the group of paging occasions, transmitting a common energy-saving signal specific to group of paging occasions to the terminal;

in a case where the network device needs to wake up at least M5 user groups in one paging occasion, transmitting a common energy-saving signal specific to paging occasion or a common energy-saving signal specific to group of paging occasions to the terminal;

in a case where the network device needs to wake up one user group in one paging occasion, transmitting an energy-saving signal specific to user group to the terminal;

where M3 is an integer greater than 0, and M3 is less than or equal to the total quantity of paging occasions in the group of paging occasions; M4 is an integer greater than 0; M5 is an integer greater than 0, and M5 is less than or equal to the total quantity of user groups in one paging occasion.

Optionally, the apparatus further includes a second transmission unit, configured to transmit to the terminal one or two pieces of the following information:

the quantity G1 of user groups included in each paging occasion, the quantity N1 of paging occasions included in a group of paging occasions corresponding to one transmission resource.

Optionally, the apparatus further includes at least one of:

a third transmission unit, configured to transmit first indication information to the terminal, where the first indication information is used to indicate a manner in which the energy-saving signals corresponding to the transmission resource are divided into the at least one group of energy-saving signals;

a fourth transmission unit, configured to transmit second indication information to the terminal, where the second indication information is used to indicate a manner in which the one group of energy-saving signals corresponding to each paging occasion are divided into energy-saving signal subgroups.

In a sixth aspect, an embodiment of the present disclosure provides an apparatus for signal communications, applied to a terminal, including:

a first receiving unit, configured to receive energy-saving signals transmitted by a network device on a transmission resource, where the energy-saving signals are used to indicate whether there is paging information in a group of paging occasions; and a second receiving unit, configured to receive a paging message according to the energy-saving signals, where the energy-saving signals corresponding to the transmission resource are divided into at least one group of energy-saving signals, and each paging occasion at least corresponds to one group of energy-saving signals, and the one group of energy-saving signals corresponding to each paging occasion includes at least one energy-saving signal subgroup, and one user group in each paging occasion at least corresponds to one energy-saving signal subgroup.

Optionally, the first receiving unit is configured to receive at least one of following signals: a common energy-saving signal specific to group of paging occasions; an energy-saving signal corresponding to each paging occasion; a common energy-saving signal specific to paging occasion; an energy-saving signal specific to user group.

Optionally, the second receiving unit is configured to:

in a case where the common energy-saving signal specific to group of paging occasions or the energy-saving signal corresponding to each paging occasion which corresponds to the terminal is detected on the transmission resource for the energy-saving signal, receive the paging message on a corresponding paging occasion;

in a case where the common energy-saving signal specific to paging occasion which corresponds to the terminal is detected on the transmission resource for the energy-saving signal, receive the paging message on a corresponding paging occasion;

in a case where the energy-saving signal specific to user group which corresponds to the terminal is detected on the transmission resource for the energy-saving signal, receive the paging message on a corresponding paging occasion.

Optionally, the apparatus further includes: a third receiving unit, configured to receive information transmitted by the network device, or obtain information that is predefined, where the information includes one or two pieces of following information: the quantity G1 of user groups included in each paging occasion, the quantity N1 of paging occasions included in a group of paging occasions corresponding to one transmission resource; and a first determination unit, configured to determine, based on the information, a manner in which the energy-saving signals corresponding to the transmission resource are divided into the at least one group of energy-saving signals.

Optionally, the apparatus further includes: a fourth receiving unit, configured to perform at least one of:

receiving first indication information transmitted by the network device, where the first indication information is used to indicate a manner in which the energy-saving signals corresponding to the transmission resource are divided into the at least one group of energy-saving signals;

receiving second indication information transmitted by the network device, where the second indication information is used to indicate a manner in which the one group of energy-saving signals corresponding to each paging occasion are divided into energy-saving signal subgroups.

In a seventh aspect, an embodiment of the present disclosure also provides a processor readable storage medium, where the processor readable storage medium stores a computer program, and the computer program is configured to enable a processor to perform the method as described above.

In embodiments of the present disclosure, in a case where the energy-saving signal corresponds to multiple transmission occasions and each transmission occasion corresponds to multiple user groups, the energy-saving signals are divided into at least one group of energy-saving signals, each paging occasion at least corresponds to one group of energy-saving signals, the one group of energy-saving signals corresponding to each paging occasion includes at least one energy-saving signal subgroup, and one user group in each paging occasion at least corresponds to one energy-saving signal subgroup. In this way, based on the solution of the embodiments of the present disclosure, not all of candidate possibilities are required to be indicated by using the sequence based PEI, thereby reducing the overhead of the network device; while the terminal does not need to detect all candidate possibilities, thereby reducing the complexity of the terminal detection.

DETAILED DESCRIPTION

The term "and/or" in the embodiments of the present disclosure describes the association relationship of associated objects and indicates that there may be three types of relationships. For example, A and/or B may represent three situations including: A alone, both A and B, and B alone. The character '/' generally indicates that the associated objects are in an 'or' relationship.

The term "multiple" in the embodiments of the present disclosure refers to two or more, the similar applies to other quantifiers.

The following clearly describes technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall in the protection scope of this application.

The embodiments of the present disclosure provide a method and an apparatus for signal communications, and a readable storage medium, to reduce an overhead of a network device and reduce a detection complexity of a terminal. The method and the apparatus are based on the same concept. Due to the similar principles for solving the problem in the method and device, implementations of the apparatus and method can be referred to each other, and the repetition will not be described.

Figure 1:
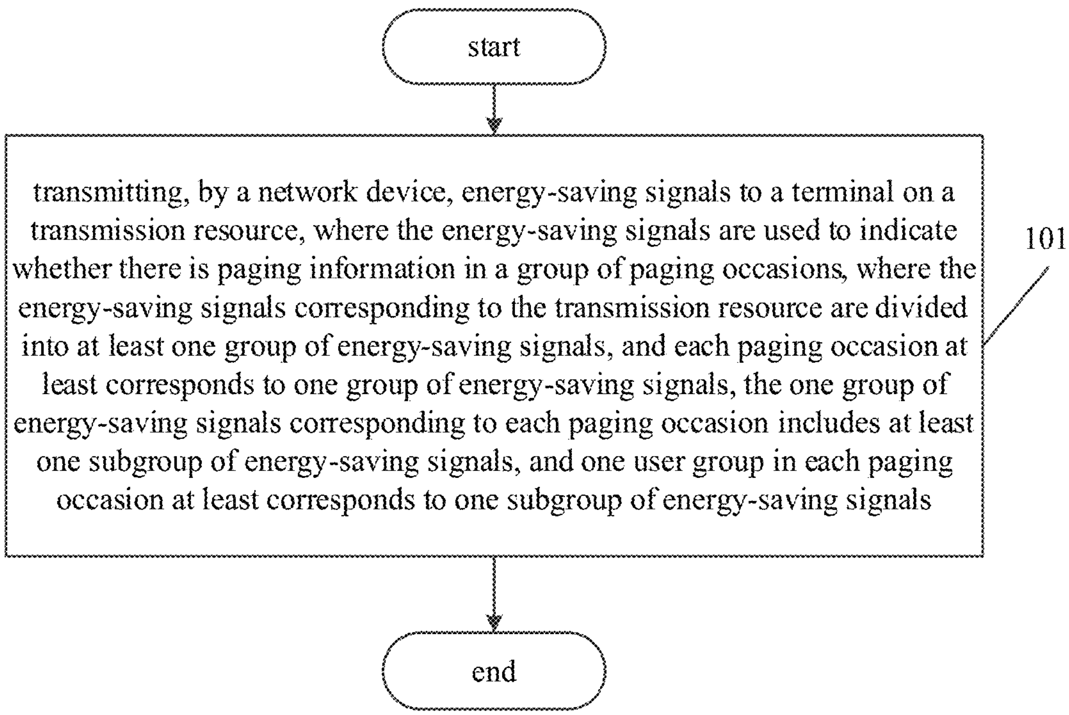
FIG. 1 is a first flow chart of a method for signal communications provided in an embodiment of the present disclosure.

Reference is made to FIG. 1, which is a flow chart of a method for signal communications provided in an embodiment of the present disclosure. As shown in FIG. 1, the method includes the following steps.

In step 101, the network device transmits energy-saving signals to a terminal on a transmission resource, where the energy-saving signals are used to indicate whether there is paging information in a group of paging occasions.

The energy-saving signals corresponding to the transmission resource are divided into at least one group of energy-saving signals, and each paging occasion at least corresponds to one group of energy-saving signals. The one group of energy-saving signals corresponding to each paging occasion includes at least one energy-saving signal subgroup, and one user group in each paging occasion at least corresponds to one energy-saving signal subgroup.

One group of energy-saving signals includes at least one energy-saving signal; one energy-saving signal subgroup includes at least one energy-saving signal. The energy-saving signal may be a PEI, for example. The terminal may be a terminal in RRC_IDLE state or RRC_INACTIVE (Radio Resource Control Inactive) state.

The one group of paging occasions may include one or more paging occasions, or multiple paging occasion groups.

In an embodiment of the present disclosure, the quantity of the transmission resource may be one or multiple. The phrase "each paging occasion at least corresponds to one group of energy-saving signals" includes at least one of the following situations: each paging occasion corresponds to the one group of energy-saving signals; each paging occasion corresponding to the one group of energy-saving signals and one group of common energy-saving signals.

Specifically, when G2=N1, each paging occasion corresponds to the one group of energy-saving signals; and when G2>N1, each paging occasion corresponds to the one group of energy-saving signals and the one group of common energy-saving signals, where G2 represents the quantity of the at least one group of energy-saving signals included in the energy-saving signals corresponding to the transmission resource (i.e., the quantity of groups of energy-saving signals are included in the energy-saving signals corresponding to the transmission resource after division), N1 represents the quantity of paging occasions included in a group of paging occasions corresponding to one transmission resource, and G2 and N1 are both integers greater than 0.

Specifically, in a case that there is only one paging occasion in the group of paging occasions, i.e., G2=N1=1, the one paging occasion corresponds to one group of energy-saving signals. That is to say, in this case, there is no group of energy-saving signals associated with all paging occasions.

To further reduce the detection complexity of the terminal, the network device may also transmit to the terminal one or two pieces of the following information: the quantity G1 of user groups included in each paging occasion, the quantity N1 of paging occasions included in a group of paging occasions corresponding to one transmission resource. For example, the network device may utilize higher-layer signaling (such as system information (System Information, SI)) to notify a terminal of G1 and/or N1, or G1 and/or N1 is configured in a manner predefined by a protocol.

The grouping manner of the energy-saving signals as mentioned above may be predefined by the protocol, or notified to the terminal by the network device through higher-layer signaling. For example, the network device may transmit first indication information to the terminal, and the first indication information is used to indicate a manner in which the energy-saving signals corresponding to the transmission resource are divided into the at least one group of energy-saving signals.

The phrase "the one user group in each paging occasion at least corresponds to one energy-saving signal subgroup" includes at least one of the following situations: the one user group in each paging occasion corresponding to the one energy-saving signal subgroup; the one user group in each paging occasion corresponding to the one energy-saving signal subgroup and one common energy-saving signal in the paging occasion.

Specifically, when G3=G1, the one user group in each paging occasion corresponds to the one energy-saving signal subgroup; and when G3>G1, the one user group in each paging occasion corresponds to the one energy-saving signal subgroup and the one common energy-saving signal in the paging occasion, where G3 represents the quantity of energy-saving signal subgroups included in the one group of energy-saving signals corresponding to each paging occasion, G1 represents the quantity of user groups included in each paging occasion, and G3 and G1 are integers greater than 0.

The manner in which the one group of energy-saving signals corresponding to each paging occasion are divided into energy-saving signal subgroups may be indicated by the network device to the terminal, which may further reduce the complexity of terminal detection. Specifically, the network device transmits second indication information to the terminal, where the second indication information is used to indicate a manner in which the one group of energy-saving signals corresponding to each paging occasion are divided into energy-saving signal subgroups.

Regarding the network device transmits the energy-saving signals to the terminal, the network device may transmit the energy-saving signals to the terminal on M1 transmission resources, where a maximum of M2 energy-saving signals are transmitted on each of the transmission resources, M1 and M2 being both integers. In an embodiment of the present disclosure, $M1 \leq 2$ and $M2 \leq 3$.

As such, the network device may transmit one energy-saving signal, two energy-saving signals or three energy-saving signals to the terminal on one transmission resource, or may transmit the energy-saving signals to the terminal on two transmission resources, where one energy-saving signal, two energy-saving signals or three energy-saving signals are transmitted on each of the transmission resources.

In order to further reduce the overhead of the network device, the network device may also transmit the energy-saving signal by using at least one of the following manners:

when $P \leq P1$, the network device transmits one energy-saving signal to the terminal on one transmission resource; when $P1 < P \leq P2$, the network device transmits two energy-saving signals to the terminal on one transmission resource; when $P1 < P \leq P2$, the network device transmits one energy-saving signal to the terminal on each of two transmission resources; when $P > P3$, the network device transmits three energy-saving signals to the terminal on one transmission resource, or the network device transmits three energy-saving signals to the terminal on two transmission resources, where P represents a paging probability, P1, P2 and P3 respectively represent a first preset value, a second preset value and a third preset value, $P1 < P2 < P3$, and P, P1, P2 and P3 are all greater than 0. P1, P2 and P3 can be set according to actual needs.

In an embodiment of the present disclosure, the energy-saving signal may be a common energy-saving signal specific to group of paging occasions, an energy-saving signal corresponding to paging occasion, a common energy-saving signal specific to paging occasion, or a common energy-saving signal specific to paging occasions, and the like. As such, that the network device transmits the energy-saving signals to the terminal on the transmission resource includes at least one of the following:

- when the network device needs to wake up M3 paging occasions in a current group of paging occasions, the network device transmits a common energy-saving signal specific to group of paging occasions to the terminal, or, the network device transmits energy-saving signals corresponding to respective paging occasions of the M3 paging occasions to the terminal;
- when the network device needs to wake up users in at least M4 groups of paging occasions, the network device transmits a common energy-saving signal specific to group of paging occasions to the terminal;
- when the network device needs to wake up at least M5 user groups in one paging occasion, the network device transmits a common energy-saving signal specific to paging occasion or a common energy-saving signal specific to group of paging occasions to the terminal;
- when the network device needs to wake up one user group in one paging occasion, the network device transmits an energy-saving signal specific to user group to the terminal,
- where M3 is an integer greater than 0, and M3 is less than or equal to the total quantity of paging occasions in the group of paging occasions; M4 is an integer greater than 0; M5 is an integer greater than 0, and M5 is less than or equal to the total quantity of user groups in the one paging occasion. The values of M3, M4, and M5 can be set according to actual needs.

In embodiments of the present disclosure, in a case where the energy-saving signal corresponds to multiple transmission occasions and each transmission occasion corresponds to multiple user groups, the energy-saving signals are divided into at least one group of energy-saving signals, each paging occasion at least corresponds to one group of energy-saving signals, the one group of energy-saving signals corresponding to each paging occasion includes at least one energy-saving signal subgroup, and one user group in each paging occasion at least corresponds to one energy-saving signal subgroup. In this way, based on the solution of the embodiments of the present disclosure, not all of candidate possibilities are required to be indicated by using the sequence based PEI, thereby reducing the overhead of the network device; while the terminal does not need to detect all candidate possibilities, thereby reducing the complexity of the terminal detection.

Figure 2:
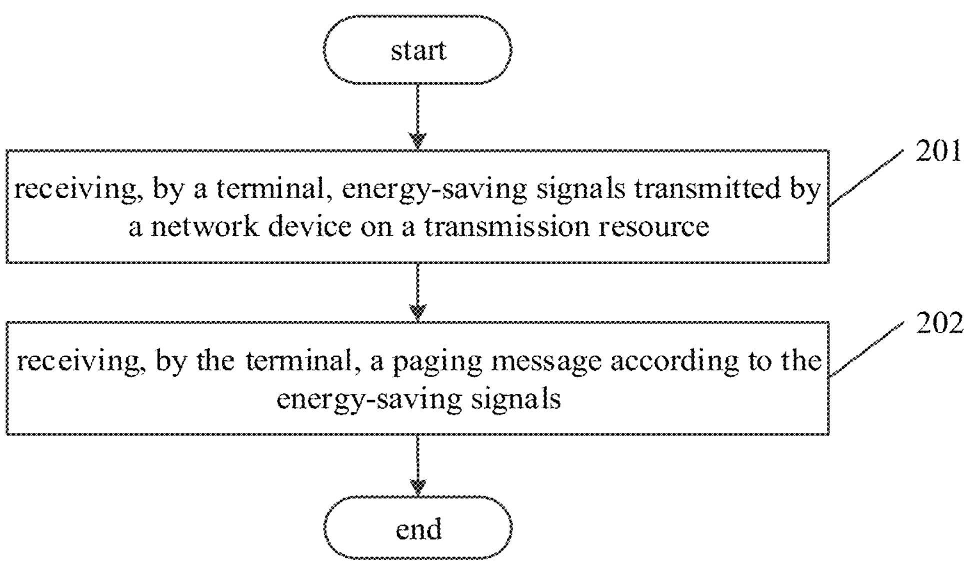
FIG. 2 is a second flow chart of a method for signal communications provided in an embodiment of the present disclosure.

Reference is made to FIG. 2, which is a flow chart of a method for signal communications provided in an embodiment of the present disclosure. As shown in FIG. 2, the method includes the following steps.

In step 201, a terminal receives energy-saving signals transmitted by a network device on a transmission resource, where the energy-saving signals are used to indicate whether there is paging information in a group of paging occasions.

The energy-saving signals corresponding to the transmission resource are divided into at least one group of energy-saving signals, and each paging occasion at least corresponds to one group of energy-saving signals, the one group of energy-saving signals corresponding to each paging occasion includes at least one energy-saving signal subgroup, and the one user group in each paging occasion at least corresponds to one energy-saving signal subgroup.

Depending on different energy-saving signals sent by the network device in different situations, the terminal may also receive corresponding different energy-saving signals. Therefore, in practical applications, the terminal may receive at least one of the following signals: a common energy-saving signal specific to group of paging occasions; an energy-saving signal corresponding to each paging occasion; a common energy-saving signal specific to paging occasion; an energy-saving signal specific to user group.

In step 202, the terminal receives a paging message according to the energy-saving signals.

If the common energy-saving signal specific to group of paging occasions or an energy-saving signal corresponding to each paging occasion which corresponds to the terminal is detected on the transmission resource for the energy-saving signal, the terminal receives the paging message on the corresponding paging occasion; if the common energy-saving signal specific to paging occasion which corresponds to the terminal is detected on the transmission resource for the energy-saving signal, the terminal receives the paging message on the corresponding paging occasion; if the energy-saving signal specific to user group which corresponds to the terminal is detected on the transmission resource for the energy-saving signal, the terminal receives the paging message on the corresponding paging occasion.

In embodiments of the present disclosure, in a case where the energy-saving signal corresponds to multiple transmission occasions and each transmission occasion corresponds to multiple user groups, the energy-saving signals are divided into at least one group of energy-saving signals, each paging occasion at least corresponds to one group of energy-saving signals, the one group of energy-saving signals corresponding to each paging occasion includes at least one energy-saving signal subgroup, and one user group in each paging occasion at least corresponds to one energy-saving signal subgroup. In this way, based on the solution of the embodiments of the present disclosure, not all of candidate possibilities are required to be indicated by using the sequence based PEI, thereby reducing the overhead of the network device; while the terminal does not need to detect all candidate possibilities, thereby reducing the complexity of the terminal detection.

In addition, on the basis of the above embodiment, in order to further reduce the complexity of terminal detection, the terminal receives one or two pieces of the following information sent by the network device, or the terminal obtains one or two pieces of the following information that is predefined. Said information includes: the quantity G1 of user groups included in each paging occasion, the quantity N1 of paging occasions included in a group of paging occasions corresponding to one transmission resource. Subsequently, the terminal determines, based on the information, a manner in which the energy-saving signals corresponding to the transmission resource are divided into the at least one group of energy-saving signals.

In the embodiments of the present disclosure, how the terminal determines the manner in which the energy-saving signals corresponding to the transmission resource are divided into at least one group of energy-saving signals is not limited. For example, the terminal may make a calculation based on some parameters, or determine according to a preset rule, to obtain the manner in which the energy-saving signals corresponding to the transmission resource are divided into the at least one group of energy-saving signals.

On the basis of the above embodiment, the method further include one or more of the following steps: receiving, by the terminal, first indication information transmitted by the network device, where the first indication information is used to indicate a manner in which the energy-saving signals corresponding to the transmission resource are divided into at least one group of energy-saving signals; receiving, by the terminal, second indication information transmitted by the network device, where the second indication information is used to indicate a manner in which one group of energy-saving signals corresponding to each paging occasion is divided into energy-saving signal subgroups.

The implementation process of embodiments of the present disclosure will be described below in combination with different embodiments. In the following embodiments, the description is given by taking an example that a network-side device is a base station.

As mentioned above, there are two candidate solutions for PEI, one is DCI-based PEI (DCI based PEI); the other is sequence-based PEI (sequence based PEI). In NR, for the idle mode, there is no signal similar to a common reference signal (Common Reference Signal, CRS) in long term evolution (long term evolution, LTE), and a tracking reference signal (Tracking Reference Signal, TRS) periodically sent in connected state. Therefore, when the DCI based PEI indication is adopted, the terminal can only use multiple synchronization signal/physical broadcast channel signal blocks (Synchronization Signal and PBCH block, SSB) to perform channel time/frequency synchronization tracking, which will inevitably increase power consumption; while the sequence based PEI itself has channel synchronization function (for example, TRS can be used as PEI), which can further reduce the reception power consumption of terminal.

Figure 3:
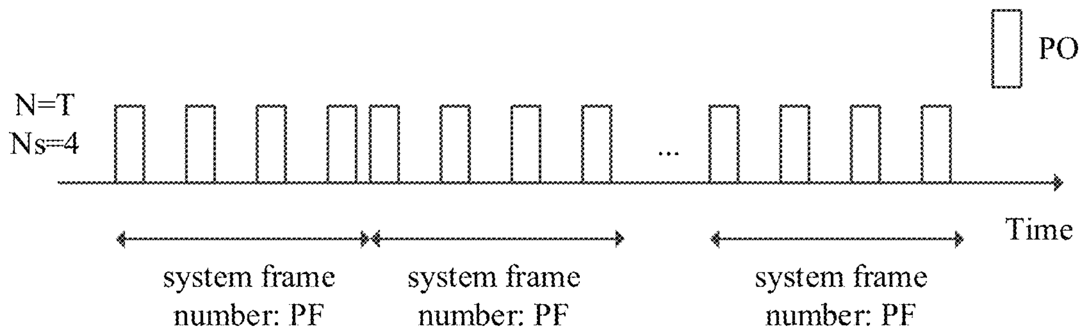
FIG. 3 is a schematic diagram of signal transmission in related technologies.

In actual transmissions, an average probability for paging information existing in one PO is 10%, but sometimes there may be burst paging information, leading to a relatively high probability for paging. Therefore, in case of a higher paging probability, the base station may only transmit PEI frequently to the terminal when the base station has configured PEI for the terminal, resulting in a sudden surge in system overhead, which may affect the transmission of PDSCH. Additionally, a value range of the total quantity N of paging frames (Paging Frame) in each DRX cycle is $$\left\{T, \frac{T}{2}, \frac{T}{4}, \frac{T}{8}, \frac{T}{16}\right\},$$

and a value range of the quantity Ns of POs contained in each paging frame is {1, 2, 4}. N×Ns may denote the total quantity of POs in a DRX cycle. When the value of N×Ns is relatively large, such as N=T, Ns=4, N×Ns=4T, it indicates that each radio frame in the DRX cycle is a PF, and each PF includes 4 POs. In this case, the POs in the DRX cycle are dense, as shown in FIG. 3. If there is a relatively high probability of paging in case of dense POs, it will further exacerbate the system overhead of PEI.

It is assumed that the PEI can simultaneously indicate whether there is a paging message in M POs, and UEs in each PO may be divided into G subgroups. When each PO is divided into G subgroups, which corresponds to $2^G$ possibilities, and there are $2^{G\times M}$ possibilities for M POs. For example, G=4, M=8, and there are $2^{G\times M}=2^{32}$ possibilities. In this case, there may be two solutions for sequence based PEI. Solution 1 is to design $2^{G\times M}$ sequences, where the terminal needs to detect which sequence is currently transmitted by the base station. In this solution, the complexity of blind detection for the terminal is extremely high, and the probability of detection false alarm is extremely high, which cannot be used in practical operations. Solution 2 is that the base station allocates $2^{G\times M}$ resources, and each resource transmits a sequence represents a subgroup in a PO, which leads to huge resource waste and thus cannot be adopted. Therefore, there is a big challenge for the sequence-based PEI supporting multiple POs with each PO supporting multiple UE groups. Embodiments of the present disclosure propose a solution to address this issue.

In a first embodiment, the quantity G1 of user groups included in each paging occasion, and/or the quantity N1 of paging occasions included in a paging occasion group corresponding to a PEI transmission resource is configured by a notification from the base station to the terminal through higher-layer signaling, or is predefined by a protocol. For example, the base station configures, by using SI for the terminal, the quantity of UE groups corresponding to each PO, such as G1=8; it is predefined through the protocol that the PEI is specific to PF (PF specific), that is, each PF corresponding to one PEI. Assuming the quantity of paging occasions in a PF is N1, such as N1=4, a corresponding PO group includes N1=4 POs.

An energy-saving signal/information corresponding to one PEI transmission resource is divided into multiple groups with the quantity of groups being G2, such as G2=4 or 5. Each energy-saving signal/information optionally corresponds to a sequence, such as a gold sequence (gold sequence) or an orthogonal sequence, which may not exclude some bits in DCI used for energy-saving purposes. The explanation of energy-saving signal/information hereinafter is the same as the explanation here, which will not be repeated in other embodiments. If G2=N1=4, each paging occasion corresponds to a group of energy-saving signals/information; if G2=N1+1, each paging occasion corresponds to a group of energy-saving signals/information, and there may be a common energy-saving signal/information corresponding to all paging occasions.

The above grouping manner of energy-saving signals/information may be preset by the protocol, or notified by the base station to the terminal through higher-layer signaling. For example, it is assumed that each energy-saving signal/information corresponds to one sequence, this sequence or a scrambled sequence corresponding to this sequence will be assigned to different groups of energy-saving signals/information based on associated information of the paging occasions, where each group of energy-saving signals/information may include energy-saving signals/information for one or more paging occasions. Specifically, the PEI sequence may also be a function of ID (Identity Document, Identity) of the energy-saving signal/information group, such as a simple linear function.

A group of energy-saving signals/information corresponding to each paging occasion may be further divided into subgroups with the quantity of subgroups being G3, where G3 is greater than or equal to the quantity G1 of user groups included in each paging occasion. Specifically, when G3=G1, one group of UEs in each paging occasion preferably corresponds to/is associated with a subgroup of energy-saving signals/information. When G3>G1, preferably G3=G1+1, in addition to the one subgroup of energy-saving signal/information which the one group of UEs in each paging occasion corresponds to/is associated with, there may be one common energy-saving signal/information in paging occasion which corresponds to all subgroups in the paging occasion.

The construction and grouping of energy-saving signals, and corresponding behaviors at the base station side and terminal side are described in details in conjunction with the sequence based PEI hereinafter.

Assuming that one PEI transmission resource corresponding to N1 paging occasions, and the sequence based PEI includes T sequences. Preferably, the sequence is a gold sequence or other pseudo random sequence or orthogonal sequence. The T sequences used for PEI are divided into G2=N1+1=5 groups, where the first group includes one PEI sequence Seq_com, which is a group of common PEI sequences that corresponds to or is associated with all paging occasions; the quantity of sequences included in each group of the second group to the fifth G2=5 group is preferably equal to the quantity of sequences included in another one group of the second group to the fifth group, namely G3 sequences. Alternatively, the quantity of sequences included in one group of the second to fifth groups may also be different from the quantity of sequences included in another group of the second to fifth groups. Each paging occasion corresponds to one group of PEI sequences, that is, PEI sequences in the $2^{nd}$, $3^{rd}$, $4^{th}$, . . . G2=5th groups correspond to, or are associated with different paging occasions.

One group of PEI sequences corresponding to each paging occasion may be further divided into G3=G1 subgroups, or G3=G1+1 subgroups, where G1 is the quantity of user groups included in each paging occasion as mentioned above. When the PEI sequences corresponding to each paging occasion are divided into G1 subgroups in accordance with the quantity of user groups contained in each paging occasion, each sequence subgroup corresponds to, or is associated with one user group in the paging occasion. When the PEI sequences corresponding to each paging occasion are divided into G1+1 subgroups, one user group in the paging occasion may be associated with one of the aforementioned sequence subgroups, that is, in this case, the G1 user subgroups in each paging occasion may correspond to G1 sequence subgroups. In addition, in this case, there is also a common sequence subgroup that corresponds to all the user subgroups in the paging occasion. Of course, in practical applications, this common sequence subgroup may also correspond to some of the user subgroups in the paging occasion.

Figure 4:
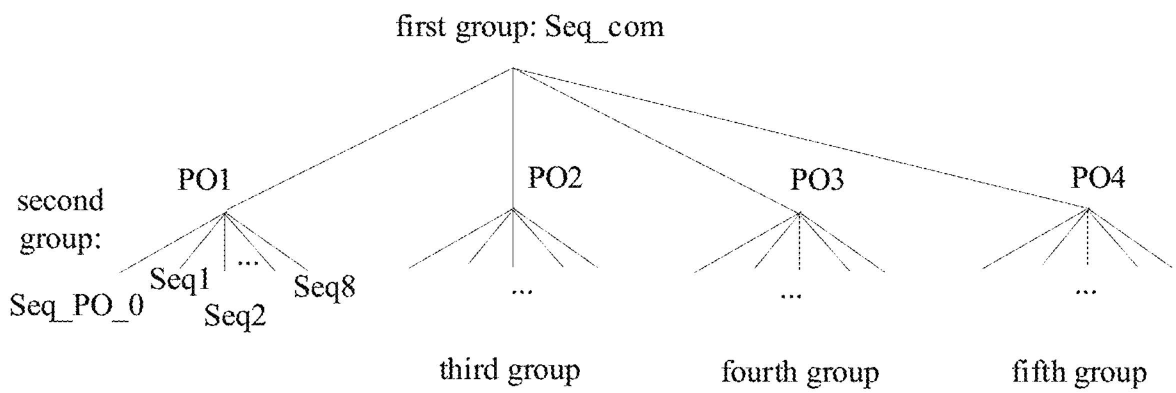
FIG. 4 is a schematic diagram of grouping of corresponding PEI sequences in each paging occasion in an embodiment of the present disclosure.

FIG. 4 illustrates a situation where PEI sequences corresponding to each paging occasion are divided into G1+1 groups. It is assumed that the total quantity of PEI sequences is 37, the PEI sequences are divided into 5 groups. The first group contains PO group specific (paging occasion group specific) common energy-saving signal/information Seq_com, and the second to fifth groups each contains 9 sequences. The PEI sequences corresponding to each paging occasion are further divided into 9 subgroups, and each of the subgroups contains only one sequence. One of the subgroups corresponds to paging occasion specific (PO specific) common energy-saving signal/information Seq_P0_0, and the remaining 8 subgroups correspond to UE subgroup specific (UE subgroup specific) energy-saving signal/information Seq_i, i=1, . . . 8.

In this case, the processing at the base station is as follows: as long as there are two or more POs within which one or more users need to be paged in a current paging occasion group, the base station transmits PO group specific common energy-saving signal/information on the PEI resource, which is specific to the PO group. In a case that there is only one PO within which one or more users need to be waked up in the paging occasion group, it may be divided into two situations: 1) if two or more UE subgroups out of the 8 UE subgroups in this PO need to be paged, the base station transmits PO specific common energy-saving signal/information that is specific to the PO; 2) if only one of the 8 UEs in the PO needs to be paged, the base station transmits UE subgroup specific energy-saving signal/information corresponding to a UE subgroup in the PO, which is specific to this UE subgroup.

Correspondingly, the processing at the UE is as follows: the UE detects, on the PEI transmission resource, at least one of: the PO group specific common energy-saving signal/information, the PO specific common energy-saving signal/information, or the UE subgroup specific energy-saving signal/information. The UE may detect at most three sequences.

If the UE detects the UE subgroup specific energy-saving signal/information in an energy-saving signal group of a PO corresponding to the UE, the UE needs to receive a paging message in a corresponding PO, where the UE subgroup specific energy-saving signal/information indicates that a user subgroup in the corresponding PO receives a corresponding paging message. If the UE detects the PO specific common energy-saving signal/information corresponding to a PO to which the UE corresponds, the UE needs to receive a paging message in subsequent PO. In fact, since the energy-saving information is common to all user subgroups corresponding to the PO, the PO specific common energy-saving signal/information may indicate that all the user subgroups in the PO need to receive a corresponding paging message. If the UE detects the PO group specific common energy-saving signal/information on a resource corresponding to PEI, the UE detects a paging message on corresponding POs. In fact, since this energy-saving information is common to all UE subgroups in the PO group, the PO group specific common energy-saving signal/information may indicate that all user subgroups corresponding to the PO group receive the corresponding paging message.

In accordance with the embodiments as described above, it is able to flexibly indicate all user subgroups corresponding to all PO groups, or all user subgroups corresponding to one PO, or a certain user subgroup in a PO group to receive a paging message in the corresponding PO. Furthermore, the base station transmits only one sequence based PEI sequence per PEI resource, and the terminal detects at most three sequences in the corresponding PEI resource. This ensures that the PEI occupies quite low system overhead at the base station side, while at the terminal side, the detection performance is excellent and the complexity of blind detection is relatively low.

Hereinafter, an analysis is given which further explains the excellent performance and feasibility of the present solution. According to the statistics of base station manufacturers, the average paging probability (paging rate) corresponding to a PO is 10%. Assuming that the paging rate X=10%, the paging rate of a paging existed in multiple PO groups may be calculated, as shown in Table 1.

TABLE 1

| 4 POs corresponding to one PEI | Calculation formula | Paging rate |
|---|---|---|
| 1 PO having paging | $C_4^1$*0.1*0.9ˆ3 | 29.16% |
| 2 POs having paging | $C_4^2$*0.1ˆ2*0.9ˆ2 | 4.86% |
| 3 POs having paging | $C_4^3$*0.1ˆ3*0.9 | 0.36% |
| 4 POs having paging | 0.1ˆ4 | 0.01% |
| No PO having paging | 0.9ˆ4 | 65.61% |

It can be seen from Table 1 that in a PO group, the probability of more than one POs having paging is very low. If UEs corresponding to two POs need to be paged at the same time, and if the base station side transmits only one PO group specific common energy-saving signal/information, there is only a rate of 4.86% for mistakenly waking up the other two POs, or there is a rate of 0.36% for mistakenly waking up the other one PO. This rate is acceptable which can avoid a huge cost is paid but a quite low gain can be obtained in the conventional solution. Table 2 shows paging rates of different subgroups (sub-group) if one PO corresponds to 8 UE subgroups, where the PO paging rate X=10% and 40% (Y represents a paging rate of each UE subgroup (UE subgroup) corresponding to the PO, then 1−(1−Y)ˆN=X, where N represents the quantity of subgroups)

TABLE 2

| Case (Case) | The quantity of subgroups (Sub-group number) | Calculate formula (Calculate formula) | Paging rate X: 10%, Y: 1.3% | Paging rate X: 40%, Y: 6.2% |
|---|---|---|---|---|
| Case 1 | 1 sub-group | $C_8^1$*Y*(1-Y)ˆ7 | 9.5% | 31.7% |
| Case 2 | 2 sub-groups | $C_8^2$*Yˆ2*(1-Y)ˆ6 | 0.4% | 7.3% |
| Case 3 | 3 sub-groups | $C_8^3$*Yˆ3*(1-Y)ˆ5 | 1.2*10ˆ(−4) | 1% |
| Case 4 | 4 sub-groups | $C_8^4$*Yˆ4*(1-Y)ˆ4 | 1.9*10ˆ(−6) | 8*10ˆ(−4) |
| Case 5 | 5 sub-groups | $C_8^5$*Yˆ5*(1-Y)ˆ3 | 2*10ˆ(−8) | 4.2*10ˆ(−5) |
| Case 6 | 6 sub-groups | $C_8^6$*Yˆ6*(1-Y)ˆ2 | 1.3*10ˆ(−10) | 1.4*10ˆ(−6) |
| Case 7 | 7 sub-groups | $C_8^7$*Yˆ7*(1-Y) | 5*10ˆ(−13) | 2.6*10ˆ(−8) |
| Case 8 | 8 sub-groups | Yˆ8 | 8.2*10ˆ(−16) | 2.2*10ˆ(−10) |

It can be seen from Table 2 that, for multiple UE subgroups corresponding to a PO, the base station has a high probability of paging only one UE subgroup in the PO regardless of whether the paging rate is high or low. Therefore, when two or more UE subgroups corresponding to one PO need to be paged, the false alarm rate caused by transmitting the PO specific common energy-saving signal/information by the base station can be ignored. Because only one PEI sequence is sent in the PEI resource, the detection performance of the UE can be ensured while ensuring the low overhead on the base station. As a result, there is a minimal impact on legacy UE (legacy UE), and a flexible indication can be realized.

In the first embodiment as mentioned above, FIG. 4 illustrates a situation where corresponding PEI sequences in each paging occasion are divided into G1+1 groups. In fact, considering that there is already a common energy-saving signal that can wake up UEs of all POs to receive a paging message, the quantity of subgroups of corresponding PEI sequences in each paging occasion may also be equal to the quantity of UE subgroups corresponding to that PO, i.e., in one-to-one correspondence (alternatively, the quantity of subgroups of corresponding PEI sequences in each paging occasion may also be less than the quantity of UE subgroups corresponding to that PO). In a second embodiment, assuming that the total quantity of PEI sequences is 33, the PEI sequences are divided into 5 groups, the first group contains PO group specific common energy-saving signal/information Seq_com, and the second to fifth groups each contains 8 sequences. PEI sequences corresponding to each paging occasion are further divided into 8 subgroups, and each of the subgroups contains only one UE subgroup specific energy-saving signal/information $Seq_{i}$, where i=1, . . . 8.

In this case, the processing at the base station is as follows: in a case that there are two or more POs in which one or more users need to be paged in a current paging occasion group, or there are two or more subgroups in one PO that need to be paged, the base station transmits PO group specific common energy-saving signal/information on a PEI resource; in a case that there is only one PO in which one or more users needs to be waked up in the paging occasions, and only one of 8 UEs in the PO needs to be paged, the base station transmits UE subgroup specific energy-saving signal/information corresponding to a UE subgroup in the PO.

In this case, the processing at UE is as follows: the UE detects, in a PEI transmission resource, at least one of: the PO group specific common energy-saving signal/information, or the UE subgroup specific energy-saving signal/information, and at most two signals/information may be detected. If the UE detects the UE subgroup specific energy-saving signal/information in an energy-saving signal group of a PO to which the UE corresponds, a UE subgroup in the PO corresponding to the UE subgroup specific energy-saving signal/information needs to receive a paging message in subsequent PO. The UE subgroup specific energy-saving signal/information may indicate only one UE group in the PO to receive a corresponding paging message. If the UE detects the PO group specific common energy-saving signal/information on the resource corresponding to PEI, the UE detects the paging message on corresponding PO. In fact, since this energy-saving information is common to all UE groups in a PO group, the PO group specific common energy-saving signal/information may indicate all user groups corresponding to the PO group to receive the corresponding paging message.

In the embodiment, a subgrouping of energy-saving signals corresponding to each paging occasion may be not performed and instead, only one sequence is used, where each paging occasion corresponds to one PEI sequence, and the PEI does not give indication for subgrouping (subgrouping) of UEs in the PO. The base station may transmit the subgrouping information by using other signal carrying subgrouping information, such as using a reserved (reserved) bit of a paging DCI to indicate the subgrouping information of the UE corresponding to the PO.

In the embodiment, the terminal only needs to detect 2 PEI sequences at most, which is beneficial for reducing the probability of false alarm and detection complexity of the terminal.

In the above two embodiments, the application scenario targeted is a typical scenario with a paging rate of 10%. Although the paging rate=10% is the average paging rate, in actual transmissions, there may be a sudden, short-term paging burst (paging burst), which causes a sudden increase in the paging rate. The design of a system should include a solution for this situation. Assuming that in a third embodiment, the architecture of the energy-saving signal grouping method can be the same as described in the previous embodiments. Here, the architecture in the aforementioned "first embodiment" will be described. Assuming that in the third embodiment, the total quantity of PEI sequences is 37, the PEI sequences are divided into 5 groups, the first group contains PO group specific common energy-saving signal/information Seq_com, the second to fifth groups each contains 9 sequences. PEI sequences corresponding to each paging occasion are further divided into 9 subgroups, each of the subgroups contains only one sequence, and one of the subgroups corresponds to PO specific common energy-saving signal/information Seq_PO_0, and the remaining 8 subgroups correspond to UE subgroup specific energy-saving signal/information Seq_i, i=1, . . . 8.

The processing at the base station is as follows: in a case that there are three or more POs in which one or more user need to be waked up in a current paging occasion group, the base station transmits PO group specific common energy-saving signal/information on a PEI resource. In a case that there is only one PO in which one or more users need to waked up in a paging occasion group, it may be divided into two situations: 1) if two or more UE subgroups out of the 8 UE subgroups in this PO need to be paged, the base station transmits the PO specific common energy-saving signal/information that is specific to the PO; 2) if only one of the 8 UEs in the PO needs to be paged, the base station transmits the UE subgroup specific energy-saving signal/information corresponding to the UE subgroup in the PO. In a case that there are two POs in which one or more users need to be paged in a paging occasion group, a corresponding PEI sequence needs to be sent for each of the POs, and in this case, the base station sends two PEI sequences in total. for the PO corresponding to each of the PEI sequences, if two of the 8 UE subgroups in the PO need to be paged, the base station sends the PO specific common energy-saving signal/information, and if only one of the 8 UEs in the PO needs to be paged, the base station sends the UE subgroup specific energy-saving signal/information corresponding to the UE group in the PO. Optionally, the base station simultaneously sends two PEI sequences on a single PEI resource. Optionally, the base station may send two PEI sequences on two PEI resources in the FDD or TDD manner. Sending two PEI sequences on the same single PEI resource may result in a poor detection performance of the terminal, but a reduce system overhead, while sending PEI sequences on two PEI resources may result in a good detection performance of the terminal, but an increase overhead.

In this case, the processing at the UE is as follows: the UE detects, on a PEI transmission resource, at least one of: the PO group specific common energy-saving signal/information, the PO specific common energy-saving signal/information, or the UE subgroup specific energy-saving signal/information. The UE may detect at most three sequences. If the UE detects the UE subgroup specific energy-saving signal/information in an energy-saving signal group of a PO corresponding to the UE, the UE needs to receive a paging message in a corresponding PO, where the UE subgroup specific energy-saving signal/information indicates only one user group in the corresponding PO to receive the corresponding paging message. If the UE detects the PO specific common energy-saving signal/information corresponding to a PO to which the UE corresponds, the UE needs to receive a paging message in subsequent PO. In fact, since this energy-saving information is common to all user subgroups corresponding to the PO, the PO specific common energy-saving signal/information may indicate that all the user subgroups in the PO need to receive the corresponding paging message. If the UE detects the PO group specific common energy-saving signal/information on the resource corresponding to PEI, the UE detects a paging message on corresponding PO. In fact, since this energy-saving information is common to all UE subgroups in the PO group, the PO group specific common energy-saving signal/information may indicate that all user subgroups corresponding to the PO group receive the corresponding paging message.

The beneficial effects and feasibility of this embodiment are described hereinafter. According to the statistics of base station manufacturers, the paging rate X corresponding to PO is 20%, and the probability for a paging existed in multiple PO groups may be calculated, as shown in Table 3 below.

TABLE 3

| 4 POs corresponding to one PEI | Calculation formula | Paging rate |
|---|---|---|
| 1 PO having paging | $C_4^1$*0.2*0.8^3 | 16.4% |
| 2 POs having paging | $C_4^2$*0.2^2*0.8^2 | 15.36% |
| 3 POs having paging | $C_4^3$*0.2^3*0.8 | 2.56% |
| 4 POs having paging | 0.2^4 | 0.16% |
| No PO having paging | 0.8^4 | 40.96% |

It can be seen from Table 3 that at a relatively high paging rate, there is a high rate for two POs in which the UE is to be waked up. Therefore, the method in this embodiment may indicate, through a PEI sequence, that UEs corresponding to one PO, two POs, and all POs are paged. Therefore, the indication method in this embodiment is more flexible, which can reduce the probability of incorrect paging at a relatively high paging rate, such that the terminal is enabled to achieve a higher energy-saving gain. In this embodiment, the base station may transmit two sequence based PEI sequences on one PEI resource at a time, which may cause a loss of detection performance of the terminal to be more than 3 dB. However, considering that the performance of sequence based PEI is better than that of DCI based PEI by more than 5 dB, the performance of sequence based PEI can be ensured to be better than that of DCI based PEI even if the base station transmits two PEI sequences simultaneously.

In an embodiment of the present disclosure, the application scenario is a scenario with a higher paging rate, such as a paging rate of 40%, which is an extreme scenario with a relatively low occurrence probability. The architecture of the energy-saving signal grouping method can be the same as described in the previous embodiments, and the architecture in the first embodiment is taken as an example. In a fourth embodiment, it is assumed that the total quantity of PEI sequences is 37, the PEI sequences are divided into 5 groups, the first group contains PO group specific common energy-saving signal/information Seq_com, and the second to fifth groups each contains 9 sequences. PEI sequences corresponding to each paging occasion are further divided into 9 subgroups, and each of the subgroups contains only one sequence, where one subgroup corresponds to common energy-saving signal/information Seq_PO_0, and the other 8 subgroups correspond to UE subgroup specific energy-saving signal/information Seq_i, i=1, . . . 8.

In this case, the processing at the base station is as follows: only when there are four POs in which one or more users need to be waked up in a current paging occasion group, the base station transmits PO group specific common energy-saving signal/information on the PEI resource. When there is only one PO in which corresponding UE(s) need to be waked up in a paging occasion group, the base station transmits one PEI sequence on the PEI resource. When there are two POs in which corresponding UEs need to be waked up in a paging occasion group, the base station transmits two PEI sequences on the PEI resource. When there are three POs in which corresponding UEs need to be waked up in a paging occasion group, the base station transmits three PEI sequences on the PEI resource. When there are four POs in which corresponding UEs need to be waked up in a paging occasion group, the base station transmits a PO group specific common energy-saving sequence on the PEI resource. When the PEI sequence is not the PO group specific common energy-saving sequence, if two of the 8 UE subgroups in the corresponding PO need to be paged, the PEI sequence is PO specific common energy-saving signal/information; if only one of the 8 UEs in the PO needs to be paged, the PEI sequence is UE subgroup specific energy-saving signal/information corresponding to a UE group in the PO. Preferably, the base station simultaneously sends two PEI sequences on one PEI resource. Optionally, the base station may send two PEI sequences on multiple PEI resources in FDD or TDD manner.

In this case, the processing at the UE is as follows: the UE detects, on a PEI transmission resource, at least one of: the PO group specific common energy-saving signal/information, the PO specific common energy-saving signal/information, or the UE subgroup specific energy-saving signal/information. The UE may detect at most three sequences. If the UE detects the UE subgroup specific energy-saving signal/information in energy-saving signal group of a PO corresponding to the UE, the UE needs to receive a paging message in a corresponding PO, where the UE subgroup specific energy-saving signal/information indicates only one user group in the corresponding PO to receive the corresponding paging message. If the UE detects the PO specific common energy-saving signal/information corresponding to a PO to which the UE corresponds, the UE needs to receive a paging message in subsequent PO. In fact, since this energy-saving information is common to all user subgroups corresponding to the PO, the PO specific common energy-saving signal/information may indicate that all the user subgroups in the PO need to receive the corresponding paging message. If the UE detects the PO group specific common energy-saving signal/information on the resource corresponding to PEI, the UE detects a paging message on corresponding PO. In fact, since this energy-saving information is common to all UE subgroups in the PO group, the PO group specific common energy-saving signal/information may indicate that all user subgroups corresponding to the PO group receive the corresponding paging message.

The beneficial effects and feasibility of this embodiment are described hereinafter. According to the statistics of base station manufacturers, the paging rate X corresponding to PO is 40%, and the probability for a paging existed in multiple PO groups may be calculated, as shown in Table 4 below.

TABLE 4

| 4 POs corresponding to one PEI | Calculation formula | Paging rate |
|---|---|---|
| 1 PO having paging | $C_4^1$*0.4*0.6^3 | 34.56% |
| 2 POs having paging | $C_4^2$*0.4^2*0.6^2 | 34.56% |
| 3 POs having paging | $C_4^3$*0.4^3*0.6 | 15.36% |
| 4 POs having paging | 0.4^4 | 2.56% |
| No PO having paging | 0.6^4 | 12.96% |

It can be seen from Table 4 that at an extremely high paging rate, there is a high probability for three POs in which UEs is to be waked up. Therefore, the method in this embodiment may indicate that UEs corresponding to one PO, two POs, and all POs are paged through PEI sequence. Therefore, the indication manner in this embodiment is more flexible as compared with the previous embodiments. When the paging rate is extremely high, the probability of incorrect paging can be reduced, such that the terminal is enabled to achieve a higher energy-saving gain. Additionally, in this embodiment, in order to avoid using higher transmission power or allocating more transmission resources by a base station, the base station can adopt the method of the third embodiment or the first embodiment, i.e., transmitting up to two PEI sequences or one PEI sequence on one resource, thereby avoiding the problem that the base station needs to transmit a large quantity of PEI sequences.

In the above embodiments, when there is only one paging occasion in the paging occasion group, energy-saving signal/information corresponding to one PEI transmission resource is divided into multiple subgroups with the quantity of subgroups being G2, where G2=N1, and the quantity of PEI sequence subgroups is equal to the quantity of POs, thus, there is no PEI subgroup associated with all paging occasions. Otherwise, the energy-saving signal/information corresponding to one PEI transmission resource is divided into multiple subgroups with the quantity of subgroups being G2, where G2=N1+1, that is, there is a PEI subgroup associated with all paging occasions, and the remaining PEI sequence subgroups correspond to POs in a one-to-one correspondence. Optionally, the energy-saving signal/information corresponding to one PEI transmission resource is divided into multiple groups with the quantity of subgroups being G2, where there is a PEI subgroup associated with all paging occasions, and a PEI sequence subgroup associated with a subset of POs in the PO group.

In the above embodiments, in a case that the PO group contains multiple POs, when there are two or more POs in which UEs need to be waked up simultaneously, the base station side transmits the PO group specific common energy-saving signal to wake up all UEs in all POs. Alternatively, when there are two POs in which UEs need to be waked up simultaneously, the base station side may not transmit the PO group specific common energy-saving signal, but may transmit an energy-saving signal corresponding to each of the POs, such as a subgroup specific energy-saving signal in the PO or a PO specific common energy-saving signal. In this way, the probability that the terminal is mistakenly waked up can be further reduced in a case that the transmission power of the base station can support, thereby facilitating energy saving at the terminal. If the quantity of POs is greater than or equal to a threshold (Threshold>=3), namely, three or more POs in which UEs need to be waked up simultaneously, the base station transmits the common energy-saving signal specific to the PO group. The threshold>=3 is only taken as an example, and other values can also be used in practical applications, or a corresponding value can be used based on implementation of the base station.

A scenario where one PEI corresponds to 4 POs and each PO corresponds to 8 UE subgroups is taken as an example. In aspect of DCI, it actually corresponds to 32 bits, which means there are 2ˆ32 possibilities. The related technologies cannot achieve the task because the base station is required to indicate so many transmission possibilities while maintaining a good performance on the base station side and terminal side. Based on the embodiments of the present disclosure, using the sequence based PEI to indicate all possible candidates can be avoided, the overhead on the base station side and the detection complexity on the terminal side are reduced, the detection performance of the terminal is improved, and the energy-saving gain of the terminal is not significantly reduced. Compared with a candidate scheme of DCI based PEI, the present solution can handle paging to terminals at different paging rates, while maintaining a compromise between the overhead on base station side and the energy-saving gain on the terminal side, which has advantages of high efficiency, good performance and good flexibility.

The technical solution according to embodiments of the present disclosure may be applied to various systems, particularly to a 5G system. For example, a suitable system may be a global system of mobile communication (global system of mobile communication, GSM) system, a code division multiple access (code division multiple access, CDMA) system, a wideband code division multiple access (Wideband Code Division Multiple Access, WCDMA) system, a time division synchronous code division multiple access (TD-SCDMA) system, a general packet radio service (general packet radio service, GPRS) system, a long term evolution (long term evolution, LTE) system, a LTE frequency division duplex (frequency division duplex, FDD) system, a LTE time division duplex (time division duplex, TDD) system, a long term evolution advanced (long term evolution advanced, LTE-A) system, a universal mobile telecommunication system (universal mobile telecommunication system, UMTS), a worldwide interoperability for microwave access (worldwide interoperability for microwave access, WiMAX) system, and a 5G New Radio (New Radio, NR) system. Each of the systems includes a terminal and a network device. The systems may further include a core network portion, such as an evolved packet system (Evolved Packet System, EPS), and a 5G system (5G System, 5GS).

The terminal involved in the embodiments of the present disclosure may be a device that provides voice and/or data connectivity to a user, a handheld device with a radio connection function, or other processing devices connected to a radio modem or the like. In different systems, the names of terminal devices may be different. For example, in a 5G system, a terminal device may be called user equipment (User Equipment, UE). Wireless terminal device can communicate with one or more core networks (Core Network, CN) via a radio access network (Radio Access Network, RAN), and wireless terminal device may be mobile terminal device, such as mobile phones (or called "cellular" phones) and computers with mobile terminal device, such as portable, pocket-sized, hand-held, computer built-in or vehicle-mounted mobile apparatuses, which exchange voice and/or data with the radio access network. For example, personal communication service (Personal Communication Service, PCS) phones, cordless phones, session initiated protocol (Session Initiated Protocol, SIP) phones, wireless local loop (Wireless Local Loop, WLL) stations, personal digital assistant (Personal Digital Assistant, PDA) and other devices. The wireless terminal device may also be called a system, subscriber unit (subscriber unit), subscriber station (subscriber station), mobile station (mobile station), mobile (mobile), remote station (remote station), access point (access point), remote terminal (remote terminal), access terminal (access terminal), user terminal (user terminal), user agent (user agent), and user device (user device), which are not limited in the embodiments of the present disclosure.

The network device involved in the embodiments of the present disclosure may be a base station. The base station may include multiple cells that provide services to terminals. Depending on the specific application scenario, the base station may be called access point, or may be a device in the access network that communicates over an air interface with wireless terminal devices through one or more sectors, or may be called another name. The network device may be used for converting the received radio frames into Internet protocol (Internet Protocol, IP) packets or vice versa, and serves as a router between the wireless terminal devices and the rest of the access network. The rest of the access network may include an IP communication network. The network device may also coordinate the attribute management of the air interface. For example, the network device involved in the embodiments of the present disclosure may be a base transceiver station (Base Transceiver Station, BTS) in the global system for mobile communications (Global System for Mobile communications, GSM) or code division multiple access (Code Division Multiple Access, CDMA), a NodeB (NodeB) in the wide-band code division multiple access (WCDMA), an evolved Node B (eNB or e-NodeB) in long term evolution (Long Term Evolution, LTE) system, a 5G base station (gNB) in 5G network architecture (next generation system), a home evolved Node B (Home evolved Node B, HeNB), a relay node (relay node), a femto (femto), a pico (pico), or the like, which is not limited herein. In some network architectures, the network device may include a centralized unit (centralized unit, CU) node and a distributed unit (distributed unit, DU) node, which may be located geographically separated.

The network device and the terminal device may each perform multi-input multi-output (Multi Input Multi Output, MIMO) transmission with each other by using one or more antennas. The MIMO transmission may be single user MIMO (Single User MIMO, SU-MIMO) or multiple user MIMO (Multiple User MIMO, MU-MIMO). According to the configuration and quantity of antenna combinations, the MIMO transmission may be two dimensional-MIMO (2 Dimension MIMO, 2D-MIMO), three dimensional-MIMO (3 Dimension MIMO, 3D-MIMO), full dimensional-MIMO (Full Dimension MIMO, FD-MIMO) or massive-MIMO (massive-MIMO), and may be diversity transmission, pre-coded transmission, beam forming transmission, or the like.

Figure 5:
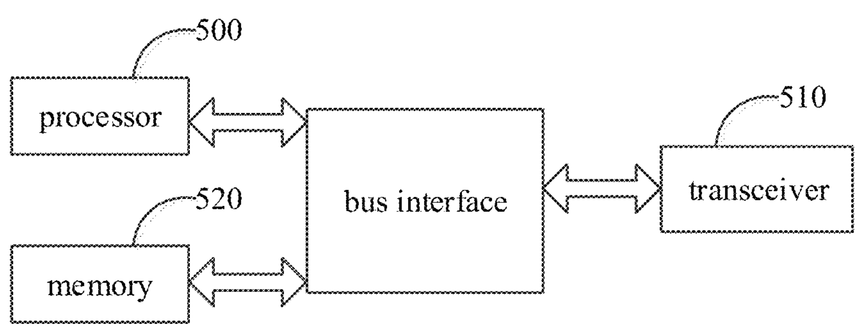
FIG. 5 is a first structural diagram of an apparatus for signal communications provided in an embodiment of the present disclosure.

As shown in FIG. 5, an apparatus for signal communications according to an embodiment of the present disclosure is applied to the network device, the apparatus includes a processor 500, configured to read a program in a memory 520 to execute the following steps:

- transmitting energy-saving signals to a terminal on a transmission resource, where the energy-saving signals are used to indicate whether there is paging information in a group of paging occasions,
- where the energy-saving signals corresponding to the transmission resource are divided into at least one group of energy-saving signals, and each paging occasion at least corresponds to one group of energy-saving signals, and
- the one group of energy-saving signals corresponding to each paging occasion includes at least one energy-saving signal subgroup, and one user group in each paging occasion at least corresponds to one energy-saving signal subgroup.

The apparatus further includes a transceiver 510, configured to receive and transmit data under the control of the processor 500.

In FIG. 5, a bus architecture may include any quantity of interconnected buses and bridges, and connects various circuits including one or more processors represented by the processor 500 and memory represented by the memory 520. The bus architecture may also connect various other circuits such as peripherals, voltage regulators and power management circuits, which is well known in the art. Therefore, a detailed description thereof is omitted herein. A bus interface provides an interface. The transceiver 510 may be multiple elements, i.e., a transmitter and a receiver, to allow for communication with various other apparatuses on the transmission medium. The processor 500 is responsible for supervising the bus architecture and normal operation and the memory 520 may store the data being used by the processor 500 during operation.

The processor 500 may be a central processing unit (Central Processing Unit, CPU), an application specific integrated circuit (Application Specific Integrated Circuit, ASIC), a field-programmable gate array (Field-Programmable Gate Array, FPGA) or a complex programmable logic device (Complex Programmable Logic Device, CPLD). The processor may also adopt a multi-core architecture.

The processor 500 is responsible for supervising the bus architecture and normal operation and the memory 520 may store the data being used by the processor 500 during operation.

Optionally, the phrase "each paging occasion at least corresponds to one group of energy-saving signals" includes at least one of the following: each paging occasion corresponding to one group of energy-saving signals; each paging occasion corresponding to one group of energy-saving signals and one group of common energy-saving signals.

Optionally, when G2=N1, each paging occasion corresponds to the one group of energy-saving signals; and when G2>N1, each paging occasion corresponds to the one group of energy-saving signals and the one group of common energy-saving signals, where G2 represents the quantity of the at least one group of energy-saving signals included in the energy-saving signals corresponding to the transmission resource, N1 represents the quantity of paging occasions included in a group of paging occasions corresponding to one transmission resource, and G2 and N1 are both integers greater than 0.

Optionally, in a case that there is only one paging occasion in the group of paging occasions, the one paging occasion corresponds to one group of energy-saving signals.

Optionally, the phrase "the one user group in each paging occasion at least corresponds to one energy-saving signal subgroup" includes at least one of the following:

- the one user group in each paging occasion corresponding to the one energy-saving signal subgroup;
- the one user group in each paging occasion corresponding to the one occasion.

Optionally, when G3=G1, the one user group in each paging occasion corresponds to the one energy-saving signal subgroup; and when G3>G1, the one user group in each paging occasion corresponds to the one energy-saving signal subgroup and the one common energy-saving signal in the paging occasion, where G3 represents the quantity of energy-saving signal subgroups included in one group of energy-saving signals corresponding to each paging occasion, G1 represents the quantity of user groups included in each paging occasion, and G3 and G1 are integers greater than 0.

Optionally, the processor is configured to read the computer program in the memory to perform the following operations: transmitting the energy-saving signals to the terminal on M1 transmission resources, where a maximum of M2 energy-saving signals are transmitted on each of the transmission resources, each of M1 and M2 being an integer.

Optionally, the processor is configured to read the computer program in the memory to perform the following operations:

- transmitting one energy-saving signal, two energy-saving signals or three energy-saving signals to the terminal on one transmission resource; or
- transmitting the energy-saving signals to the terminal on two transmission resources, where one energy-saving signal, two energy-saving signals or three energy-saving signals are transmitted on each transmission resource.

Optionally, the processor is configured to read the computer program in the memory to perform the following operations:

- when $P \leq P1$, transmitting one energy-saving signal to the terminal on one transmission resource;

when $P1<P\leq P2$, transmitting two energy-saving signals to the terminal on one transmission resource;

when $P1<P\leq P2$, transmitting one energy-saving signal to the terminal on each of two transmission resources;

when $P>P3$, transmitting three energy-saving signals to the terminal on one transmission resource, or transmitting three energy-saving signals to the terminal on two transmission resources, where P represents a paging rate, P1, P2 and P3 respectively represent a first preset value, a second preset value and a third preset value, $P1<P2<P3$, and each of P, P1, P2 and P3 is greater than 0.

Optionally, the processor 500 is configured to read the computer program in the memory to perform the following operations:

when the network device needs to wake up M3 paging occasions in a current group of paging occasions, transmitting, by the network device, a common energy-saving signal specific to group of paging occasions to the terminal, or, transmitting, by the network device, energy-saving signals corresponding to respective paging occasions of the M3 paging occasions to the terminal;

when the network device needs to wake up at least M4 users in the group of paging occasions, transmitting, by the network device, a common energy-saving signal specific to group of paging occasions to the terminal;

when the network device needs to wake up at least M5 user groups in one paging occasion, transmitting, by the network device, a common energy-saving signal specific to paging occasion or a common energy-saving signal specific to group of paging occasions to the terminal;

when the network device needs to wake up one user group in one paging occasion, transmitting, by the network device, an energy-saving signal specific to user group to the terminal, where M3 is an integer greater than 0, and M3 is less than or equal to the total quantity of paging occasions in the group of paging occasions; M4 is an integer greater than 0; M5 is an integer greater than 0, and M5 is less than or equal to the total quantity of user groups in one paging occasion.

Optionally, the processor 500 is configured to read the computer program in the memory to perform the following operations: transmitting, to the terminal, one or two pieces of the following information: the quantity G1 of user groups included in each paging occasion, the quantity N1 of paging occasions included in a group of paging occasions corresponding to one transmission resource.

Optionally, the processor 500 is configured to read the computer program in the memory to perform the following operations:

transmitting first indication information to the terminal, where the first indication information is used to indicate a manner in which the energy-saving signals corresponding to the transmission resource are divided into at least one group of energy-saving signals;

transmitting second indication information to the terminal, where the second indication information is used to indicate a manner in which the one group of energy-saving signals corresponding to each paging occasion are divided into energy-saving signal subgroups.

It should be noted that the above apparatus provided in the embodiments of the present disclosure can implement all method steps in the method implemented in the above method embodiments, and can achieve the same technical effects. Therefore, the description and beneficial effects of this embedment that are the same as those of the method embodiments will not be further elaborated in detail.

Figure 6:
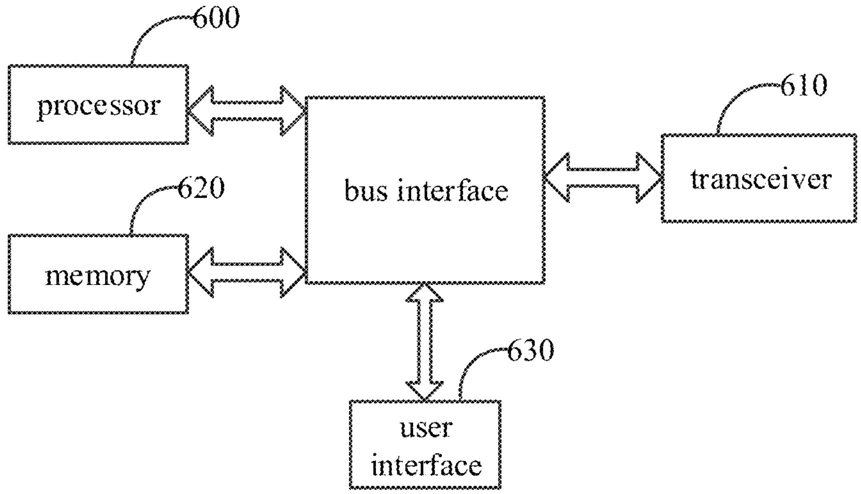
FIG. 6 is a second structural diagram of an apparatus for signal communications provided in an embodiment of the present disclosure.

As shown in FIG. 6, an apparatus for signal communications according to an embodiment of the present disclosure is applied to a terminal, the apparatus includes: a processor 600, configured to read a program in memory 620 to execute the following processes:

receiving energy-saving signals transmitted by a network device on a transmission resource, where the energy-saving signals are used to indicate whether there is paging information in a group of paging occasions; and receiving a paging message according to the energy-saving signals, where the energy-saving signals corresponding to the transmission resource are divided into at least one group of energy-saving signals, and each paging occasion at least corresponds to one group of energy-saving signals, the one group of energy-saving signals corresponding to each paging occasion includes at least one energy-saving signal subgroup, and one user group in each paging occasion at least corresponds to one energy-saving signal subgroup.

The apparatus further includes a transceiver 610, configured to receive and transmit data under the control of processor 600.

In FIG. 6, a bus architecture may include any quantity of interconnected buses and bridges, and connects various circuits including one or more processors represented by the processor 600 and memory represented by the memory 620. The bus architecture may also connect various other circuits such as peripherals, voltage regulators and power management circuits, which is well known in the art. Therefore, a detailed description thereof is omitted herein. A bus interface provides an interface. The transceiver 610 may be multiple elements, i.e., a transmitter and a receiver, to allow for communication with various other apparatuses on the transmission medium. These transmission media include wireless channel, wired channel, optic fiber or the like. For different user equipment, the user interface 630 may be an interface capable of externally or internally connecting a required device, and the connected device includes, but is not limited to: a keypad, a display, a speaker, a microphone, a joystick and the like.

The processor 600 is responsible for supervising the bus architecture and normal operation and the memory 620 may store the data being used by the processor 600 during operation.

The processor 600 may be a central processing unit (Central Processing Unit, CPU), an application specific integrated circuit (Application Specific Integrated Circuit, ASIC), a field-programmable gate array (Field-Programmable Gate Array, FPGA) or a complex programmable logic device (Complex Programmable Logic Device, CPLD). The processor may also adopt a multi-core architecture.

The processor is configured to execute any of the methods provided in the embodiments of the present disclosure according to the obtained executable instructions by calling a computer program stored in the memory. The processor and memory may also be physically arranged to be separated.

Optionally, the processor 600 is also configured to read the program to receive at least one of following signals: a common energy-saving signal specific to group of paging occasions; an energy-saving signal corresponding to each paging occasion; a common energy-saving signal specific to paging occasion; an energy-saving signal specific to user group.

Optionally, the processor 600 is also configured to read the computer program in the memory to perform the following operations:

when the common energy-saving signal specific to group of paging occasions or the energy-saving signal corresponding to each paging occasion which corresponds to the terminal is detected on the transmission resource for the energy-saving signal, receiving the paging message on a corresponding paging occasion;

when the common energy-saving signal specific to paging occasion which corresponds to the terminal is detected on the transmission resource for the energy-saving signal, receiving the paging message on a corresponding paging occasion;

when the energy-saving signal specific to user group which corresponds to the terminal is detected on the transmission resource for the energy-saving signal, receiving the paging message on a corresponding paging occasion.

Optionally, the processor 600 is further configured to read the computer program in the memory to perform the following operations:

receiving information transmitted by the network device, or obtaining information that is predefined, where the information includes one or two pieces of following information: the quantity G1 of user groups included in each paging occasion, the quantity N1 of paging occasions included in a group of paging occasions corresponding to one transmission resource; and determining, based on the information, a manner in which the energy-saving signals corresponding to the transmission resource are divided into the at least one group of energy-saving signals.

Optionally, the processor 600 is further configured to read the computer program in the memory to perform the following operations:

receiving first indication information transmitted by the network device, where the first indication information is used to indicate a manner in which the energy-saving signals corresponding to the transmission resource are divided into the at least one group of energy-saving signals;

receiving second indication information transmitted by the network device, where the second indication information is used to indicate a manner in which the one group of energy-saving signals corresponding to each paging occasion are divided into energy-saving signal subgroups.

It should be noted that the above apparatus provided in the embodiment of the present disclosure can implement all method steps in the method implemented in the above method embodiments, and can achieve the same technical effects. Therefore, the description and beneficial effects of this embedment that are the same as the method embodiments will not be described here in detail.

Figure 7:
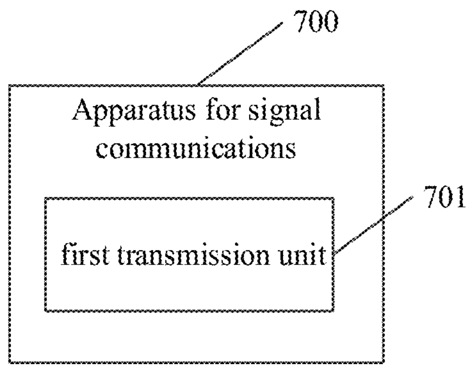
FIG. 7 is a third structural diagram of an apparatus for signal communications provided in an embodiment of the present disclosure.

As shown in FIG. 7, an apparatus for signal communications according to an embodiment of the present disclosure is applied to the network device, the apparatus includes:

a first transmission unit 701, configured to transmit energy-saving signals to a terminal on a transmission resource, where the energy-saving signals are used to indicate whether there is paging information in a group of paging occasions, where the energy-saving signals corresponding to the transmission resource are divided into at least one group of energy-saving signals, and each paging occasion at least corresponds to one group of energy-saving signals, the one group of energy-saving signals corresponding to each paging occasion includes at least one energy-saving signal subgroup, and one user group in each paging occasion at least corresponds to one energy-saving signal subgroup.

Optionally, the phrase "each paging occasion at least corresponds to one group of energy-saving signals" includes at least one of the following:

each paging occasion corresponds to the one group of energy-saving signals;

each paging occasion corresponds to the one group of energy-saving signals and one group of common energy-saving signals.

Optionally, when G2=N1, each paging occasion corresponds to the one group of energy-saving signals; and when G2>N1, each paging occasion corresponds to the one group of energy-saving signals and the one group of common energy-saving signals, where G2 represents the quantity of the at least one group of energy-saving signals included in the energy-saving signals corresponding to the transmission resource, N1 represents the quantity of paging occasions included in a group of paging occasions corresponding to one transmission resource, and G2 and N1 are both integers greater than 0.

Optionally, in a case that there is only one paging occasion in the group of paging occasions, the one paging occasion corresponds to one group of energy-saving signals.

Optionally, the phrase "the one user group in each paging occasion at least corresponds to one energy-saving signal subgroup" includes at least one of the following:

the one user group in each paging occasion corresponding to the one energy-saving signal subgroup;

the one user group in each paging occasion corresponding to the one occasion.

Optionally, when G3=G1, the one user group in each paging occasion corresponds to the one energy-saving signal subgroup; and when G3>G1, the one user group in each paging occasion corresponds to the one energy-saving signal subgroup and the one common energy-saving signal in the paging occasion, where G3 represents the quantity of energy-saving signal subgroups included in one group of energy-saving signals corresponding to each paging occasion, G1 represents the quantity of user groups included in each paging occasion, and G3 and G1 are integers greater than 0.

Optionally, the first transmission unit 701 is configured to transmit the energy-saving signals to the terminal on the transmission resource on M1 transmission resources, where a maximum of M2 energy-saving signals are transmitted on each of the transmission resources, each of M1 and M2 being an integer.

Optionally, M1≤2 and M2≤3.

The first transmission unit 701 is configured to transmit one energy-saving signal, two energy-saving signals or three energy-saving signals to the terminal on one transmission resource; or to transmit the energy-saving signals to the terminal on two transmission resources, where one energy-saving signal, two energy-saving signals or three energy-saving signals are transmitted on each of the transmission resources.

The first transmission unit 701 is configured to perform at least one of:

- when P≤ P1, transmitting, by the network device, one energy-saving signal to the terminal on one transmission resource;
- when P1<P≤P2, transmitting, by the network device, two energy-saving signals to the terminal on one transmission resource;
- when P1<P≤ P2, transmitting, by the network device, one energy-saving signal to the terminal on each of two transmission resources;
- when P>P3, transmitting, by the network device, three energy-saving signals to the terminal on one transmission resource, or transmitting, by the network device, three energy-saving signals to the terminal on each of two transmission resources,
- where P represents a paging rate, P1, P2 and P3 respectively represent a first preset value, a second preset value and a third preset value, P1<P2<P3, and each of P, P1, P2 and P3 is greater than 0.

The first transmission unit 701 is configured to perform at least one of:

- when the network device needs to wake up M3 paging occasions in a current group of paging occasions, transmitting, by the network device, a common energy-saving signal specific to group of paging occasions to the terminal, or, transmitting, by the network device, energy-saving signals corresponding to respective paging occasions of the M3 paging occasions to the terminal;
- when the network device needs to wake up at least M4 users in the group of paging occasions, transmitting a common energy-saving signal specific to group of paging occasions to the terminal;
- when the network device needs to wake up at least M5 user groups in one paging occasion, transmitting a common energy-saving signal specific to paging occasion or a common energy-saving signal specific to group of paging occasions to the terminal;
- when the network device needs to wake up one user group in one paging occasion, transmitting an energy-saving signal specific to user group to the terminal,
- where M3 is an integer greater than 0, and M3 is less than or equal to the total quantity of paging occasions in the group of paging occasions; M4 is an integer greater than 0; M5 is an integer greater than 0, and M5 is less than or equal to the total quantity of user groups in one paging occasion.

The apparatus further includes a second transmission unit, configured to transmit to the terminal one or two pieces of the following information: the quantity G1 of user groups included in each paging occasion, the quantity N1 of paging occasions included in a group of paging occasions corresponding to one transmission resource.

The apparatus further includes at least one of:

- a third transmission unit, configured to transmit first indication information to the terminal, where the first indication information is used to indicate a manner in which the energy-saving signals corresponding to the transmission resource are divided into at least one group of energy-saving signals;
- a fourth transmission unit, configured to transmit second indication information to the terminal, where the second indication information is used to indicate a manner in which the one group of energy-saving signals corresponding to each paging occasion are divided into energy-saving signal subgroups.

It should be noted that the above apparatus provided in the embodiments of the present disclosure can implement all method steps in the method implemented in the above method embodiments, and can achieve the same technical effects. Therefore, the description and beneficial effects of this embedment that are the same as the method embodiments will not be further elaborated in detail.

Figure 8:
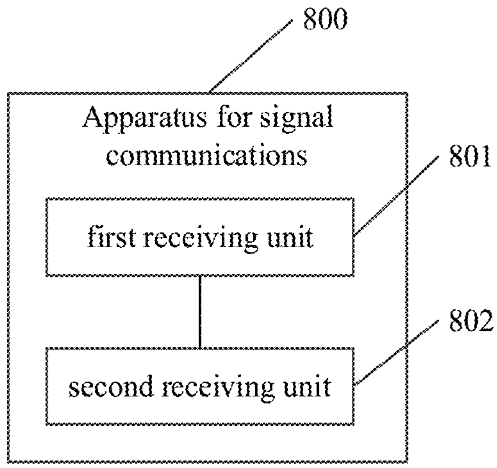
FIG. 8 is a fourth structural diagram of an apparatus for signal communications provided in an embodiment of the present disclosure.

As shown in FIG. 8, an apparatus for signal communications according to an embodiment of the present disclosure is applied to a terminal, the apparatus includes:

- a first receiving unit 801, configured to receive energy-saving signals transmitted by a network device on a transmission resource, where the energy-saving signals are used to indicate whether there is paging information in a group of paging occasions; and
- a second receiving unit 802, configured to receive a paging message according to the energy-saving signals,
- where the energy-saving signals corresponding to the transmission resource are divided into at least one group of energy-saving signals, and each paging occasion at least corresponds to one group of energy-saving signals, the one group of energy-saving signals corresponding to each paging occasion includes at least one energy-saving signal subgroup, and one user group in each paging occasion at least corresponds to one energy-saving signal subgroup.

The first receiving unit 801 is configured to receive at least one of following signals: a common energy-saving signal specific to group of paging occasions; an energy-saving signal corresponding to each paging occasion; a common energy-saving signal specific to paging occasion; an energy-saving signal specific to user group.

The second receiving unit 802 is configured to: when the common energy-saving signal specific to group of paging occasions or the energy-saving signal corresponding to each paging occasion which corresponds to the terminal is detected on the transmission resource for the energy-saving signal, receive the paging message on a corresponding paging occasion; when the common energy-saving signal specific to paging occasion which corresponds to the terminal is detected on the transmission resource for the energy-saving signal, receive the paging message on a corresponding paging occasion; when the energy-saving signal specific to user group which corresponds to the terminal is detected on the transmission resource for the energy-saving signal, receive the paging message on a corresponding paging occasion.

Optionally, the apparatus may further include: a third receiving unit, configured to receive information transmitted by the network device, or obtain information that is predefined, where the information includes one or two pieces of following information: the quantity G1 of user groups included in each paging occasion, the quantity N1 of paging occasions included in a group of paging occasions corresponding to one transmission resource.

- the apparatus may further include: a first determination unit, configured to determine, based on the information, a manner in which the energy-saving signals corresponding to the transmission resource are divided into at least one group of energy-saving signals.

Optionally, the apparatus may further include a fourth receiving unit, configured for performing at least one of the following:

receiving first indication information transmitted by the network device, where the first indication information is used to indicate a manner in which the energy-saving signals corresponding to the transmission resource are divided into at least one group of energy-saving signals;

receiving second indication information transmitted by the network device, where the second indication information is used to indicate a manner in which the one group of energy-saving signals corresponding to each paging occasion are divided into energy-saving signal subgroups.

It should be noted that the above apparatus provided in the embodiments of the present disclosure can achieve all method steps in the method implemented in the above method embodiments, and can achieve the same technical effects. Therefore, the description and beneficial effects of this embedment that are the same as the method embodiments will not be further elaborated in detail.

It should be noted that the division of units in the embodiments of the present disclosure is illustrative, and is only a logical function division, and there may be another division method in actual implementation. In addition, the functional units in various embodiments of the present disclosure may be integrated into one processing unit, or each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on such an understanding, essential parts, or parts contributing to the related art, of the technical solution of the present disclosure, or all or a part of the technical solution may be implemented in a form of a software product. The computer software product is stored in a storage medium, and includes several instructions to enable a computer device (which may be a personal computer, a server, or a network device, etc.) or a processor (processor) to execute all or part of the steps of the methods described in the various embodiments of the present disclosure. The aforementioned storage media include: a universal serial bus (USB) flash drive, removable hard disk, read-only memory (Read-Only Memory, ROM), random access memory (Random Access Memory, RAM), magnetic disk, optical disc or other media that can store program codes.

The present disclosure further provides in an embodiment a readable storage medium, storing a program. The program is configured to be executed by a processor to implement the steps of the foregoing method embodiments. The readable storage medium may be any available medium or data storage device that can be accessed by the processor, including but not limited to magnetic storage (such as floppy disk, hard disk, magnetic tape, magneto-optical disk (MO)), optical storage (such as compact disc (CD), digital versatile disc (DVD), blue-ray disc (BD), high-definition versatile disc (HVD)), and semiconductor memory (such as ROM, electrically programmable ROM (EPROM), electrically erasable programmable ROM (EEPROM), non-volatile memory (NAND FLASH), solid-state drive (SSD)), etc.

It should be noted that in this specification, terms "comprise", "include" and any other variants thereof are intended to cover non-exclusive inclusion, so that a process, a method, an article, or an apparatus that includes a series of elements not only includes these very elements, but also includes other elements not expressly listed, or includes elements inherent to this process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

It should be noted and understood that the division of the above modules is only a division of logical functions, which may be fully or partially integrated into a physical entity or physically separated in actual implementations. These modules may all be implemented in the form of software called by processing elements; or may all be implemented in the form of hardware; or, some modules may be implemented in the form of software called by processing elements, and some modules may be implemented in the form of hardware. For example, the determination module may be a separate processing element, or may be integrated into a certain chip of the above device, or, may be stored in the memory of the above—device in the form of program code, and a certain processing element of the above device may call and execute the functions of the determination. Other modules have similar implementations. In addition, all or part of these modules may be integrated together, and may be implemented independently. The processing element mentioned here may be an integrated circuit with signal processing capability. In the implementation process, the various steps of the above method or the above various modules may be implemented by an integrated logic circuit in hardware form in elements of a processor or instructions in the form of software.

For example, the various modules, units, subunits or submodules may be one or more integrated circuits configured to implement the above methods, such as one or more application specific integrated circuits (Application Specific Integrated Circuit, ASIC), or one or more microprocessors (Digital Signal Processor, DSP), or one or more field programmable gate arrays (Field Programmable Gate Array, FPGA), etc. As another example, when a module described above is implemented in the form of scheduling program codes by a processing element, the processing element may be a general-purpose processor, such as a central processing unit (Central Processing Unit, CPU) or other processors that may call program codes. As another example, these modules may be integrated together and implemented as a system-on-a-chip (system-on-a-chip, SOC).

Terms such as "first" and "second" in the specification and the claims of the present disclosure are used to distinguish similar objects and are not necessarily used to describe a specific order or sequence. It should be understood that the terms used in this way may be interchanged under appropriate circumstances, so that the embodiments of the present application described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent to the process, method, product, or device. Moreover, the term "and/or" used in the specification and the claims indicates involving at least one of connected objects, for example, A and/or B and/or C means 7 situations including: A alone, B alone, C alone, both A and B, both B and C, both A and C, and all of A, B and C. Similarly, the use of "at least one of A and B" in this specification and claims should be understood as "A alone, B alone, or both A and B".

The embodiments of this application are described above with reference to the accompanying drawings, but this application is not limited to the foregoing specific implementations. The foregoing specific implementations are merely schematic instead of being restrictive. Under enlightenment of this application, a person of ordinary skills in the art may make many forms without departing from the purpose of this disclosure and protection scope of claims, all of which shall fall within the protection scope of this application.

What is claimed is:

1. A signal transmission method, comprising:

transmitting, by a network device, power saving signals to a terminal on a transmission resource, wherein the power saving signals are used to indicate whether there is paging information in a group of paging occasions comprising a plurality of paging occasions, wherein the power saving signals are sequence based power saving signals, the power saving signals corresponding to the transmission resource are divided into a plurality of groups of power saving signals, and each paging occasion at least corresponds to one group of power saving signals in the plurality of groups of power saving signals, and the one group of power saving signals corresponding to each paging occasion comprises one or more power saving signal subgroups, and one user equipment group in each paging occasion at least corresponds to one power saving signal subgroup;

wherein each paging occasion at least corresponds to one group of power saving signals comprises one or more of:

each paging occasion corresponds to the one group of power saving signals; or each paging occasion corresponds to the one group of power saving signals and one group of common power saving signals; and/or wherein the one user equipment group in each paging occasion at least corresponds to one power saving signal subgroup comprises one or more of:

the one user equipment group in each paging occasion corresponds to one power saving signal subgroup; or the one user equipment group in each paging occasion corresponds to one power saving signal subgroup and one common power saving signal in the paging occasion; and wherein in case of G2=N1, each paging occasion corresponds to the one group of power saving signals; and in case of G2>N1, each paging occasion corresponds to the one group of power saving signals and the one group of common power saving signals, and wherein G2 represents the quantity of the plurality of groups of power saving signals comprised in the power saving signals corresponding to the transmission resource, N1 represents the quantity of paging occasions comprised in the group of paging occasions corresponding to the transmission resource, and G2 and N1 are both integers greater than 0; or wherein in case of G3=G1, the one user equipment group in each paging occasion corresponds to the one power saving signal subgroup; and in case of G3>G1, the one user equipment group in each paging occasion corresponds to the one power saving signal subgroup and the one common power saving signal in the paging occasion, and wherein G3 represents the quantity of the one or more power saving signal subgroups comprised in the one group of power saving signals corresponding to each paging occasion, G1 represents the quantity of user equipment groups comprised in each paging occasion, and G3 and G1 are both integers greater than 0.

2. The method according to claim 1, wherein the transmitting, by a network device, power saving signals to a terminal on a transmission resource comprises:

transmitting, by the network device, the power saving signals to the terminal on M1 transmission resources, wherein a maximum of M2 power saving signals are transmitted on each transmission resource, and M1 and M2 are both integers; and/or wherein the transmitting, by a network device, power saving signals to a terminal on a transmission resource comprises one or more of:

in a case where the network device needs to wake up users in M3 paging occasions in a current group of paging occasions, transmitting, by the network device, a common power saving signal specific to group of paging occasions to the terminal, or, transmitting, by the network device, a power saving signal corresponding to each paging occasion of the M3 paging occasions to the terminal;

in a case where the network device needs to wake up at least M4 users in the group of paging occasions, transmitting, by the network device, a common power saving signal specific to group of paging occasions to the terminal;

in a case where the network device needs to wake up at least M5 user equipment groups in one paging occasion, transmitting, by the network device, a common power saving signal specific to paging occasion or a common power saving signal specific to group of paging occasions to the terminal; or in a case where the network device needs to wake up one user equipment group in one paging occasion, transmitting, by the network device, a power saving signal specific to user equipment group to the terminal, wherein M3 is an integer greater than 0, and M3 is less than or equal to a total quantity of paging occasions in the group of paging occasions; M4 is an integer greater than 0; M5 is an integer greater than 0, and M5 is less than or equal to a total quantity of user equipment groups in one paging occasion.

3. The method according to claim 2, wherein the transmitting, by the network device, the power saving signals to the terminal on M1 transmission resources comprises:

transmitting, by the network device, one power saving signal, or two power saving signals or three power saving signals to the terminal on one transmission resource; or transmitting, by the network device, the power saving signals to the terminal on two transmission resources, wherein one power saving signal, two power saving signals or three power saving signals are transmitted on each transmission resource; or wherein the transmitting, by the network device, the power saving signals to the terminal on M1 transmission resources comprises one or more of:

in case of P≤P1, transmitting, by the network device, one power saving signal to the terminal on one transmission resource;

in case of P1<P≤P2, transmitting, by the network device, two power saving signals to the terminal on one transmission resource;

in case of P1<P≤P2, transmitting, by the network device, one power saving signal to the terminal on each of two transmission resources; or in case of P>P3, transmitting, by the network device, three power saving signals to the terminal on one transmission resource, or transmitting, by the network device, three power saving signals to the terminal on two transmission resources, wherein P represents a paging rate, P1, P2 and P3 represent a first preset value, a second preset value and a third preset value, respectively, P1<P2<P3, and each of P, P1, P2 and P3 is greater than 0.

4. The method according to claim 1, further comprising:

transmitting, by the network device to the terminal, one or two pieces of following information:

the quantity G1 of user equipment groups comprised in each paging occasion, the quantity N1 of paging occasions comprised in a group of paging occasions corresponding to one transmission resource.

5. The method according to claim 1, further comprising one or more of following steps:

transmitting, by the network device, first indication information to the terminal, wherein the first indication information is used to indicate a manner in which the power saving signals corresponding to the transmission resource are divided into the plurality of groups of power saving signals; or transmitting, by the network device, second indication information to the terminal, wherein the second indication information is used to indicate a manner in which the one group of power saving signals corresponding to each paging occasion are divided into power saving signal subgroups.

6. A method for signal communications, comprising:

receiving, by a terminal, power saving signals transmitted by a network device on a transmission resource, wherein the power saving signals are used to indicate whether there is paging information in a group of paging occasions comprising a plurality of paging occasions; and receiving, by the terminal, a paging message according to the power saving signals, wherein the power saving signals are sequence based power saving signals, the power saving signals corresponding to the transmission resource are divided into a plurality of groups of power saving signals, and each paging occasion at least corresponds to one group of power saving signals in the plurality of groups of power saving signals, and the one group of power saving signals corresponding to each paging occasion comprises one or more power saving signal subgroups, and one user equipment group in each paging occasion at least corresponds to one power saving signal subgroup;

wherein each paging occasion at least corresponds to one group of power saving signals comprises one or more of:

each paging occasion corresponds to the one group of power saving signals; or each paging occasion corresponds to the one group of power saving signals and one group of common power saving signals; and/or wherein the one user equipment group in each paging occasion at least corresponds to one power saving signal subgroup comprises one or more of:

the one user equipment group in each paging occasion corresponds to one power saving signal subgroup; or the one user equipment group in each paging occasion corresponds to one power saving signal subgroup and one common power saving signal in the paging occasion; and wherein in case of G2=N1, each paging occasion corresponds to the one group of power saving signals; and in case of G2>N1, each paging occasion corresponds to the one group of power saving signals and the one group of common power saving signals, and wherein G2 represents the quantity of the plurality of groups of power saving signals comprised in the power saving signals corresponding to the transmission resource, N1 represents the quantity of paging occasions comprised in the group of paging occasions corresponding to the transmission resource, and G2 and N1 are both integers greater than 0; or wherein in case of G3=G1, the one user equipment group in each paging occasion corresponds to the one power saving signal subgroup; and in case of G3>G1, the one user equipment group in each paging occasion corresponds to the one power saving signal subgroup and the one common power saving signal in the paging occasion, and wherein G3 represents the quantity of the one or more power saving signal subgroups comprised in the one group of power saving signals corresponding to each paging occasion, G1 represents the quantity of user equipment groups comprised in each paging occasion, and G3 and G1 are both integers greater than 0.

7. The method according to claim 6, wherein the receiving, by a terminal, power saving signals transmitted by a network device on a transmission resource comprises:

receiving one or more of following signals:

a common power saving signal specific to group of paging occasions; a power saving signal corresponding to each paging occasion; a common power saving signal specific to paging occasion; or a power saving signal specific to user equipment group.

8. The method according to claim 7, wherein the receiving, by the terminal, a paging message according to the power saving signals comprises:

in a case where the common power saving signal specific to group of paging occasions or the power saving signal corresponding to each paging occasion which corresponds to the terminal is detected on the transmission resource for the power saving signal, receiving, by the terminal, the paging message on a corresponding paging occasion;

in a case where the common power saving signal specific to paging occasion which corresponds to the terminal is detected on the transmission resource for the power saving signal, receiving, by the terminal, the paging message on a corresponding paging occasion;

in a case where the power saving signal specific to user equipment group which is corresponding to the terminal is detected on the transmission resource for the power saving signal, receiving, by the terminal, the paging message on a corresponding paging occasion.

9. The method according to claim 6, further comprising:

receiving, by the terminal, information transmitted by the network device, or obtaining, by the terminal, information that is predefined, wherein, the information comprises one or two pieces of following information: the quantity G1 of user equipment groups comprised in each paging occasion, or the quantity N1 of paging occasions comprised in a group of paging occasions corresponding to one transmission resource; and the method further comprises: determining, by the terminal based on the information, a manner in which the power saving signals corresponding to the transmission resource are divided into the plurality of groups of power saving signals; or wherein the method further comprises one or more of following steps:

receiving, by the terminal, first indication information transmitted by the network device, wherein the first indication information is used to indicate a manner in which the power saving signals corresponding to the transmission resource are divided into the plurality of groups of power saving signals; or receiving, by the terminal, second indication information transmitted by the network device, wherein the second indication information is used to indicate a manner in which the one group of power saving signals corresponding to each paging occasion are divided into power saving signal subgroups.

10. An apparatus for signal communications, applied to a terminal, comprising a memory, a transceiver and a processor, wherein the memory is configured to store a computer program; the transceiver is configured to send and receive data under control of the processor; and the processor is configured to read the computer program in the memory to perform the method according to claim 6.

11. The apparatus according to claim 10, wherein the processor is configured to read the computer program in the memory to perform:

receiving one or more of following signals:

a common power saving signal specific to group of paging occasions; a power saving signal corresponding to each paging occasion; a common power saving signal specific to paging occasion; a power saving signal specific to user equipment group; or wherein the processor is configured to read the computer program in the memory to perform:

in a case where the common power saving signal specific to group of paging occasions or the power saving signal corresponding to each paging occasion which corresponds to the terminal is detected on the transmission resource for the power saving signal, receiving the paging message on a corresponding paging occasion;

in a case where the common power saving signal specific to paging occasion which corresponds to the terminal is detected on the transmission resource for the power saving signal, receiving the paging message on a corresponding paging occasion;

in a case where the power saving signal specific to user equipment group which is corresponding to the terminal is detected on the transmission resource for the power saving signal, receiving the paging message on a corresponding paging occasion.

12. The apparatus according to claim 10, wherein the processor is configured to read the computer program in the memory to perform:

receiving information transmitted by the network device, or obtaining information that is predefined, wherein the information comprises one or two pieces of following information: the quantity G1 of user equipment groups comprised in each paging occasion, or the quantity N1 of paging occasions comprised in a group of paging occasions corresponding to one transmission resource;

determining, based on the information, a manner in which the power saving signals corresponding to the transmission resource are divided into the plurality of groups of power saving signals; or the processor is configured to read the computer program in the memory to perform one or more of:

receiving first indication information transmitted by the network device, wherein the first indication information is used to indicate a manner in which the power saving signals corresponding to the transmission resource are divided into the plurality of groups of power saving signals; or receiving second indication information transmitted by the network device, wherein the second indication information is used to indicate a manner in which the one group of power saving signals corresponding to each paging occasion is divided into power saving signal subgroups.

13. An apparatus for signal communications, applied to a network device, comprising a memory, a transceiver and a processor, wherein the memory is configured to store a computer program; the transceiver is configured to transmit and receive data under control of the processor; and the processor is configured to read the computer program in the memory to perform:

transmitting power saving signals to a terminal on a transmission resource, wherein the power saving signals are used to indicate whether there is paging information in a group of paging occasions comprising a plurality of paging occasions, wherein the power saving signals are sequence based power saving signals, the power saving signals corresponding to the transmission resource are divided into a plurality of groups of power saving signals, and each paging occasion at least corresponds to one group of power saving signals in the plurality of groups of power saving signals, and the one group of power saving signals corresponding to each paging occasion comprises one or more power saving signal subgroups, and one user equipment group in each paging occasion at least corresponds to one power saving signal subgroup;

wherein each paging occasion at least corresponds to one group of power saving signals comprises one or more of:

each paging occasion corresponds to the one group of power saving signals; or each paging occasion corresponds to the one group of power saving signals and one group of common power saving signals; and/or wherein the one user equipment group in each paging occasion at least corresponds to one power saving signal subgroup comprises one or more of:

the one user equipment group in each paging occasion corresponds to one power saving signal subgroup; or the one user equipment group in each paging occasion corresponds to one power saving signal subgroup and one common power saving signal in the paging occasion; and wherein in case of G2=N1, each paging occasion corresponds to the one group of power saving signals; and in case of G2>N1, each paging occasion corresponds to the one group of power saving signals and the one group of common power saving signals, and wherein G2 represents the quantity of the plurality of groups of power saving signals comprised in the power saving signals corresponding to the transmission resource, N1 represents the quantity of paging occasions comprised in the group of paging occasions corresponding to the transmission resource, and G2 and N1 are both integers greater than 0; or wherein in case of G3=G1, the one user equipment group in each paging occasion corresponds to the one power saving signal subgroup; and in case of G3>G1, the one user equipment group in each paging occasion corresponds to the one power saving signal subgroup and the one common power saving signal in the paging occasion, and wherein G3 represents the quantity of the one or more power saving signal subgroups comprised in the one group of power saving signals corresponding to each paging occasion, G1 represents the quantity of user equipment groups comprised in each paging occasion, and G3 and G1 are both integers greater than 0.

14. The apparatus according to claim 13, wherein the processor is configured to read the computer program in the memory to perform:

transmitting first indication information to the terminal, wherein the first indication information is used to indicate a manner in which the power saving signals corresponding to the transmission resource are divided into the plurality of groups of power saving signals; or transmitting second indication information to the terminal, wherein the second indication information is used to indicate a manner in which the one group of power saving signals corresponding to each paging occasion are divided into power saving signal subgroups.

15. The apparatus according to claim 13, wherein the processor is configured to read the computer program in the memory to perform:

transmitting the power saving signals to the terminal on M1 transmission resources, wherein a maximum of M2 power saving signals are transmitted on each transmission resource, and M1 and M2 are both integers; or wherein the processor is configured to read the computer program in the memory to perform:

in a case where the network device needs to wake up users in M3 paging occasions in a current group of paging occasions, transmitting, by the network device, a common power saving signal specific to group of paging occasions to the terminal, or, transmitting, by the network device, a power saving signal corresponding to each paging occasion of the M3 paging occasions to the terminal;

in a case where the network device needs to wake up at least M4 users in the group of paging occasions, transmitting, by the network device, a common power saving signal specific to group of paging occasions to the terminal;

in a case where the network device needs to wake up at least M5 user equipment groups in one paging occasion, transmitting, by the network device, a common power saving signal specific to paging occasion or a common power saving signal specific to group of paging occasions to the terminal; or in a case where the network device needs to wake up one user equipment group in one paging occasion, transmitting, by the network device, a power saving signal specific to user equipment group to the terminal, wherein M3 is an integer greater than 0, and M3 is less than or equal to a total quantity of paging occasions in the group of paging occasions; M4 is an integer greater than 0; M5 is an integer greater than 0, and M5 is less than or equal to a total quantity of user equipment groups in one paging occasion.

16. The apparatus according to claim 15, wherein the processor is configured to read the computer program in the memory to perform:

transmitting one power saving signal, two power saving signals or three power saving signals to the terminal on one transmission resource; or transmitting the power saving signals to the terminal on two transmission resources, wherein one power saving signal, two power saving signals or three power saving signals are transmitted on each transmission resource; or wherein the processor is configured to read the computer program in the memory to perform:

in case of $P \leq P1$, transmitting, by the network device, one power saving signal to the terminal on one transmission resource;

in case of $P1 < P \leq P2$, transmitting, by the network device, two power saving signals to the terminal on one transmission resource;

in case of $P1 < P \leq P2$, transmitting, by the network device, one power saving signal to the terminal on each of two transmission resources; or in case of $P > P3$, transmitting, by the network device, three power saving signals to the terminal on one transmission resource, or transmitting, by the network device, three power saving signals to the terminal on two transmission resources, wherein P represents a paging rate, P1, P2 and P3 represent a first preset value, a second preset value and a third preset value, respectively, $P1 < P2 < P3$, and each of P, P1, P2 and P3 is greater than 0.

17. The apparatus according to claim 13, wherein the processor is configured to read the computer program in the memory to perform:

transmitting, to the terminal, one or two pieces of following information:

the quantity G1 of user equipment groups comprised in each paging occasion, the quantity N1 of paging occasions comprised in a group of paging occasions corresponding to one transmission resource.

* * * * *